United States Patent [19]

Tecotzky et al.

[11] Patent Number: 5,140,163
[45] Date of Patent: Aug. 18, 1992

[54] REPRODUCTION OF X-RAY IMAGES WITH PHOTOSTIMULABLE PHOSPHOR

[75] Inventors: Melvin Tecotzky, Mendham, N.J.; George Blasse, GC Bunnik; Andries Meijerink, HT Wijk bij Duurstede, both of Netherlands; David R. Terrell, Lint; Luc A. Struye, Mortsel, both of Belgium

[73] Assignee: AGFA-Gevaert, N.V., Mortsel, Belgium

[21] Appl. No.: 245,621

[22] Filed: Sep. 16, 1988

Related U.S. Application Data

[63] Continuation-in-part of Ser. No. 89,785, Aug. 17, 1987, abandoned.

[51] Int. Cl.$^5$ .................. G01N 23/04; C09K 11/46
[52] U.S. Cl. ........................ 250/484.1; 252/301.4 F
[58] Field of Search ................ 250/484.1, 327.2; 252/301.4 H, 301.4 F

[56] References Cited

U.S. PATENT DOCUMENTS

| | | | |
|---|---|---|---|
| 3,984,346 | 10/1976 | Gilloland | 252/301.4 F |
| 4,128,498 | 12/1978 | Hase et al. | 252/301.4 F |
| 4,220,551 | 9/1980 | Fouressier et al. | 252/301.4 F |
| 4,261,854 | 4/1981 | Kotera et al. | 250/327.2 A |
| 4,512,911 | 4/1985 | Kotera et al. | 250/484.1 B |

OTHER PUBLICATIONS

O. Berg et al., X-Ray Storage Propert. of IR ... Phosphors, J. of Applied Physics, vol. 18, Apr. 1947 p. 343.

Primary Examiner—Janice A. Howell
Assistant Examiner—Richard Hanig
Attorney, Agent, or Firm—Breiner & Breiner

[57] ABSTRACT

A method for recording and reproducing an X-ray image is provided which method comprises the steps of:
(1) causing a photostimulable phosphor to absorb image-wise or pattern-wise modulated X-rays,
(2) photostimulating said phosphor with stimulating electromagnetic radiation selected from visible light and infrared light to release from the phosphor in accordance with the absorbed X-rays electromagnetic radiation different in wavelength characteristic from the radiation used in the photo-stimulation, and
(3) detecting said light emitted by photostimulation, wherein said phosphor is a halosilicate containing as host metal at least one member selected from the group consisting of Ca, Sr, Ba, Mg, Cd, Zn and Pb, as halogen at least one member selected from the group consisting of Cl, Br and I, and comprising as dopant(s) $Eu^{2+}$ and/or $Cr^{3+}$.

33 Claims, 18 Drawing Sheets

REPRODUCTION OF X-RAY IMAGES WITH PHOTOSTIMULABLE PHOSPHOR

DESCRIPTION

This is a continuation-in-part of application Ser. No. 07/085,785 filed Aug. 17, 1987 now abandoned.

This invention relates to a photostimulable phosphor and to a method of recording and reproducing an X-ray pattern by means of a binder layer containing said phosphor in a screen or panel.

It is well known that X-rays can cause appropriate substances to luminesce. Substances showing the phenomenon of luminescence under the influence of X-rays are called phosphors.

According to a classical method of recording and reproducing an X-ray pattern phosphors are used to form radiographs in conjunction with photographic-silver halide emulsion materials being highly sensitive to the emitted fluorescent light.

The phosphors used in said screens should be luminescent but not exhibit appreciable long lived emission after the X-ray source is switched off. If a screen with marked-long lived emission were to be used, it would retain its image after the X-ray beam had ceased and fresh film contacted with it would gain a so-called ghost impression that would interfere with the next image to be made. This phenomenon being undesirable in the production of radiographs by contact exposure with a fluorescent X-ray conversion screen is known under the terms "after-glow" and "lag".

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infra-red light scans the panel to stimulate the release of stored energy as light that is detected and converted to sequential electrical signals which are processable to produce a visible image. For this purpose, the phosphor should store as much as possible of the incident X-ray energy and emit as little as possible of energy until stimulated by the scanning beam.

As described in U.S. Pat. No. 4,239,968 europium-doped barium fluorohalides are particularly useful for application as stimulable phosphors for their high sensitivity to stimulating light of a He-Ne laser beam (633 nm), ruby laser beam (694 nm) and YAG laser beam (1064 nm), the optimum of stimulation being in the range of 500 to 700 nm. The light emitted on stimulation, called stimulated light is situated in the wavelength range of 350 to 450 nm with its main peak at 390 nm (ref. the periodical Radiology, September 1983, p. 834).

As described in said periodical the imaging plate containing the stimulable phosphor can be used repeatedly to store X-ray images simply by flooding it with light to erase the residual energy it contains.

As can be learned from DE-OS 3,347,207 europium-doped barium fluorohalides are chemically not stable and are more particularly sensitive to moisture which according to experiments affects their fluorescence power.

In C.R. (Comptes Rendus) Acad. Sc. Paris, t. 290 Ser. C Volume 289, p. 157–159 (1980) Alain Garcia, Claude Fouassier, B. Latourette and Paul Hagemuller report that $Ba_5SiO_4Cl_6$ doped with $Eu^{2+}$ exhibits a blue fluorescence under UV excitation mentioning also the crystal structure and lattice constants of said phosphor.

In the Journal of the Electrochemical Society, Oct. 1979, Vol. 126, p. 1734–1736 A. Garcia, B. Latourette and C. Fouassier describe the photoluminescent properties of $Ba_5SiO_4Cl_6$:Eu, $Ba_5Si_2O_6Cl_6$:Eu and $Ba_7Si_2O_7Cl_8$:Eu and their preparation, crystal structure, lattice constants and the "d" values and intensities of their X-ray diffraction spectra.

In C.R. Acad. Sc. Paris, Serie C, Vol. 290, p. 33 to 35 (1979) A. Garcia, C. Fouassier and P. Hagenmuller describe the X-ray excited luminescence of $Ba_5SiO_4Cl_6$:Eu and $Ba_5SiO_4Br_6$:Eu together with the crystal structure and lattice constants of $Ba_5SiO_4Br_6$:Eu.

A. Winkler, B. Ziemer and W. Wieker in Zeitschrift für anorganische und allgemeine Chemie, Volume 504, p. 89–94 (1983) confirmed the crystal structures reported by A. Garcia et al., for $Ba_5SiO_4Cl_6$:Eu, $Ba_5Si_2O_6Cl_6$:Eu and $Ba_7Si_2O_7Cl_8$:Eu and described their preparation. They also reported three new strontium chlorosilicates $Sr_5[SiO_4]Cl_6$, $Sr_5[Si_2O_7]Cl_4$ and $Sr_8[Si_4O_{12}]Cl_8$ and describe their preparation, crystal structures, lattice constants and the "d" values and estimated intensities of their X-ray diffraction spectra.

$Eu^{2+}$-doped $Ca_3SiO_4Cl_2$ phosphors have been described for cathode ray tube applications in GB-P 1,414,381 and the photoluminescent properties of this phosphor have been described by W. L. Wanmaker and J. T. Verriet in Philips Research Reports, Volume 28, p. 80–83 (1973).

H. L. Burns, K. P. Nicholson and H. P. Rooksby in Journal of Luminescence, Volume 3, p. 467–476 (1971) have reported the photoluminescence properties of $Eu^{2+}$-activated $Sr_3Si_3O_8Cl_4$ and several calcium halosilicates. $Eu^{2+}$-doped $Sr_3Si_3O_8Cl_4$ phosphors have been described for application in low pressure mercury vapour lamps in JP 55/147,586. More recently X. Jing and Z. Huang in Gaodeng Xuexiao Huaxue Xuebao, Volume 7, p. 559–564 (1986) have reported on the photoluminescence properties of $Eu^{2+}$ and $Pb^{2+}$ activated $Sr_4Si_3O_8Cl_4$ phosphors and Z. Huang, X. Jing and H. Yu in Gaodeng Xuexiao Huaxue Xuebao, Volume 7, p. 759–764 (1986) have reported the photoluminescence properties of $Ce^{3+}$, $Tb^{3+}$ and $Ce^{3+}$-$Tb^{3+}$ ion-pair activated $Sr_4Si_3O_8Cl_4$ phosphors.

In none of the above references that relate to alkaline earth halosilicates have these phosphors been described as photostimulable phosphors for the recording and reproduction of X-ray images according to a technique described in the U.S. Pat. Nos. 3,859,527 and 4,239,968.

Stimulable phosphors by the fact that they have to store for some time some of the energy contained in the irradiating X-rays are less suitable for use in classical X-ray intensifying screens from which the emission has to proceed promptly and as completely as possible at the moment of X-ray irradiation.

It is an object of the present invention to provide a process for recording and reproducing X-ray patterns wherein halosilicate phosphors are used for storing energy contained in said X-rays and said energy is freed again by photostimulation in the form of electronically detectable photons of shorter wavelength than the light used in the photostimulation.

It is another object of the present invention to provide new halosilicate phosphors which are chemically very stable and not hygroscopic and although relatively close in structure and composition to known phosphors described for use in classical X-ray intensifying screens or other applications based on luminescence are particularly useful as photostimulable phosphors in a process for recording and reproducing an X-ray image by X-ray energy storage in the phosphor followed by photostimulated emission of the stored energy in the form of light that can be converted into electrical signals.

It is a further object of the present invention to provide an X-ray screen or panel containing said photostimulable phosphor dispersed in a binder layer.

Other objects and advantages of the present invention will become clear from the following description.

In accordance with the present invention a method for recording and reproducing an X-ray image is provided which method comprises the steps of:

(1) causing a photostimulable phosphor to absorb image-wise or pattern-wise modulated X-rays, (2) photostimulating said phosphor with stimulating electromagnetic radiation selected from visible light and infrared light to release from the phosphor in accordance with the absorbed X-rays electromagnetic radiation different in wavelength characteristic from the radiation used in the photostimulation, and (3) detecting said light emitted by photostimulation, characterized in that said phosphor is a halosilicate containing as host metal at least one member selected from the group consisting of Ca, Sr, Ba, Mg, Cd, Zn and Pb, as halogen at least one member selected from the group consisting of Cl, Br and I, and comprising as dopant(s), also called activator(s), $Eu^{2+}$ and/or $Ce^{3+}$.

According to a preferred embodiment said dopant(s), $Eu^{2+}$ and/or $Ce^{3+}$ are present in said phosphor in combination with (a) co-dopant(s) being at least one member selected from the group consisting of La, Y, Sc and the lanthanons also called lanthanide elements.

In accordance with the present invention a photostimulable phosphor is provided which is a halosilicate containing as host metal at least one member selected from the group consisting of Ca, Sr, Ba, Mg, Cd, Zn and Pb, as halogen at least one member selected from the group consisting of Cl, Br and I, and as activator (dopant) $Eu^{2+}$ in combination with (a) co-dopant(s) being at least one member selected from the group consisting of La, Y, Sc and the lanthanide elements excluding $Eu^{2+}$ or said co-dopant(s) being sodium and/or potassium.

Further in accordance with the present invention a photostimulable phosphor is provided which is a halosilicate containing as host metal at least one member selected from the group consisting of Ca, Sr, Ba, Mg, Cd, Zn and Pb, as halogen at least one member selected from the group consisting of Cl, Br and I, and as activator (dopant) $Ce^{3+}$ in combination with (a) co-dopant(s) being at least one member selected from the group consisting of La, Y, Sc and the lanthanide elements excluding $Ce^{3+}$ and terbium or said co-dopant(s) being sodium and/or potassium.

The term silicate applies to different chemical compounds including anions consisting of silicon and oxygen. Examples thereof are orthosilicate $(SiO_4)^{4-}$, pyrosilicate $(Si_2O_7)^{6-}$, and polysilicate anions such as $(SiO_3)_n^{2n-}$, $(Si_4O_{11})_n^{6n-}$ and $(Si_2O_5)_n^{2n-}$ described in "Inorganic Chemistry—A Textbook for Advanced Students, by E. de Barry Barnett and C. L. Wilson—London Green and Co—London, p. 292-294 (1955).

Phosphors that are particularly useful for application in the method according to the present invention are within the scope of following empirical formula or a multiple thereof:

$$M_xM'_zSi_yO_{x+2y}X_{2z}:aA', bA''$$

wherein:

M and M' (same or different) are selected from the group consisting of Ca, Sr, Ba, Mg, Cd, Zn and Pb, X is a member selected from the group consisting of Cl, Br and I or is a mixture of at least two of said elements, A' represents a member selected from the group consisting of $Eu^{2+}$ and $Ce^{3+}$ or a mixture thereof, A'' represents at least one member selected from the group consisting of La, Y, Sc and the lanthanide elements or represents at least one of sodium and potassium, x is in the range $3.5 > x > 0.5$, y is in the range $3.5 > y > 0.5$, z is in the range $4.5 > z > 0.1$, a satisfies the following relation: $10^{-4} < a/(x+z+a+b) < 10^{-1}$, and b satisfies the following relation: $0 \leq b/(x+z+a+b) < 5 \times 10^{-2}$.

In a class of preferred photostimulable halosilicate phosphors for use according to the present invention M and M' correspond to Sr and/or Ba, $x = 2$, $y = 1$ and $z = 3$.

Preferred phosphors for use according to the present invention correspond to one of the following empirical formulae:

$$(Sr,Ba)_5SiO_4Cl_6:aA',bA''; (Sr,Ba)_5Si_2O_6Cl_6:aA', bA'';$$

$$(Sr,Ba)_5SiO_4Br_6:aA',bA''; (Sr,Ba)_5Si_2O_7Cl_4:aA', bA'';$$

$$(Sr,Ba)_4Si_3O_8Cl_4:aA', bA'', \text{ and}$$

$$(Sr,Ba)_3Si_2O_{7-x/2}Cl_x:aA',bA''.$$

wherein:

A' represents a member selected from the group consisting of $Eu^{2+}$ and $Ce^{3+}$ or a mixture thereof.

A'' represents at least one member selected from the group consisting of La, Y, Sc and the lanthanide elements, a is the atomic fraction of A' and is in the range $10^{-4}$ to $10^{-1}$, and b is the atomic fraction of A'' and is in the range 0 to $5 \times 10^{-2}$.

The presence of a mixture of the dopants A' and A'', wherein A' and A'' are different elements and/or have different chemical valency provides a strong photostimulable luminescence after X-ray irradiation. It is assumed that the A'' dopants, so-called co-activators are incorporated on M and M' sites and function as electron traps thereby enhancing the trapping of charge carriers upon X-ray irradiation (excitation).

Preferred photostimulable phosphors for use according to the present invention include for A'' one or more of gadolinium, yttrium, lanthanum, samarium and lutetium.

In order to obtain an image-wise emission of light corresponding with the X-ray pattern whereto the phosphor-binder layer had been exposed said layer is exposed to stimulating visible light or infra-red light, but preferably for obtaining a high gain of emitted light is exposed with stimulating light in the wavelength range of 480–560 nm.

According to an embodiment the photostimulation of the phosphor-binder layer that has been image-wise or pattern-wise exposed with X-rays proceeds with a scanning light beam, preferably a laser light beam. Taking into account the high photostimulatability by light in the wavelength range of 480–560 nm an argon ion laser emitting a 514 nm line, Nd-YAG laser with frequency doubler with maximum light power available at 532 nm and He-Cd lasers with emission lines at 533.7 and 537.8 nm are particularly useful. Such does not mean however, that the use of a He-Ne laser emitting at 633 nm is excluded.

As described in detail below a correct detection of the light emitted by photostimulation is obtained by filtering out almost completely the stimulating light by one or more optical filters having a high transmission for the light emitted on photostimulation.

The light emitted by photostimulation is detected preferably with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced. For said embodiment and apparatus used therein reference is made e.g. to the periodical Radiology, Sept. 1983, p. 833–838.

According to another embodiment the digital signals obtained from the analog-digital conversion of the electrical signals corresponding with the light obtained through photostimulation are displayed on a cathoderay tube. Before display the signals may be processed by computer. Conventional image processing techniques can be applied to reduce the signal-to-noise ratio of the image and enhance the image quality of coarse or fine image features of the radiograph.

The photostimulable phosphors suited for use according to the present invention can be prepared by firing mixtures of alkaline earth, Cd, Zn, and/or Pb compounds yielding upon pyrolysis the corresponding oxides in combination with silica and hydrated $M'X_2$ for periods of up to 40 hours at temperatures between 700° and 1100° C. The doping with A' and A" is achieved e.g. by co-mixing A' doped oxidic alkaline earth, Zn, Cd, and/or Pb compounds with A" doped oxidic alkaline earth, Zn, Cd, and/or Pb compounds; and/or mixing oxidic alkaline earth, Zn, Cd and/or Pb compounds with A' and A" compounds. Excess $M'X_2$ or another flux, e.g. $(NH_4)_2CO_3$ or $NH_4Cl$, can be added to promote the formation of the present halosilicate phosphors.

For use in the method according to the present invention the stimulable phosphor is used preferably dispersed in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth)acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m2.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 to 0.5 mm.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer; or it may be a coloured pigment layer absorbing stimulating radiation but reflecting the emitted light as described e.g. in U.S. Pat. No. 4,380,702.

In order to improve resolution it is possible to provide underneath the phosphor layer a layer absorbing the emitted light e.g. a carbon black containing layer or to use a coloured support e.g. a grey or black film support.

On the phosphors of the present invention measurements have been carried out for determining their photo-physical properties.

First the emission spectrum of the phosphor under X-ray excitation is measured. The measurement proceeds with a spectrofluorimeter in which excitation by X-ray irradiation is carried out with an X-ray source operating at 110 kVp. During continuous X-ray excitation the emitted light is scanned by a monochromator coupled to a photomultiplier. This emission spectrum is identical to that obtained upon photostimulation and is used to determine which filters are to be used in all the other measurements. A first filter transmits the emitted light obtained by photostimulation but filters out almost all of the stimulating light. For He-Ne laser stimulation (633 nm) a combination of 2.5 mm HOYA B 410 and 2.5 mm HOYA B 440 filters is used, whose transmission spectra are described in the HOYA Color Filter Glass Catalogue No. 8503E published by the HOYA Corporation, Tokyo, Japan.

For argon ion laser stimulation (514 nm line) a 5 mm Schott BG 3 filter or a 5 mm HOYA B 390 filter is used whose transmission spectra are described in Farb- und Filterglas Catalogue No. 3531/4d published by SCHOTT GLASWERKE, Mainz, W-Germany and in the HOYA Color Filter Glass Catalogue No. 8503E published by HOYA Corporation, Tokyo, Japan respectively.

In the second measurement the total photostimulable energy stored upon exposure to a given X-ray dose is determined. Prior to X-ray excitation any residual energy still present in the phosphor screen is removed by irradiation. To avoid photoexcitation during erasure a cut-off filter is used which eliminates all wavelengths below the photoexcitation cut-off wavelength. In the case of $Ba_5SiO_4Br_6:Eu^{2+},A''$ phosphors, for example, a cut-off SCHOTT GG435 filter which eliminates all wavelengths below 435 nm is placed between a lamp emitting photostimulating light and the phosphor screen. The phosphor screen is then excited with an X-ray source operating at 85 kVp and 20 mA. For that purpose the MONODOR X-ray source of Siemens AG—W. Germany may be used. The low energy X-rays are filtered out with a 21 mm thick aluminium plate to harden the X-ray spectrum. After X-ray excitation the phosphor screen is transferred in the dark to the measurement setup. In this setup laser light is used to photostimulate the X-ray irradiated phosphor screen. The lasers used in this measurement are the He-Ne (633 nm), argon ion (514 nm), semi-conductor (750 and 820 nm) and Nd:YAG (1064 nm) lasers.

The laser-optics comprise an electronic shutter, a beam-expander and two filters. A photomultiplier (Hamamatsu R 1398) collects the light emitted by the photostimulation and gives a corresponding electrical current. The measurement procedure is controlled by a Hewlett Packard HP 9826 computer connected to a HP 6944 multiprogrammer. After amplification with a current to voltage converter a TEKTRONIX 7D20 digital oscilloscope visualizes the photocurrent obtained. When the electronic shutter is opened the laser beam begins to stimulate the phosphor screen and the digital oscilloscope is triggered. Using a pinhole placed in contact with the screen an area of only 1.77 mm2 is exposed. Only half of the laser power (5 mW) reaches the screen surface. In this way the intensity of the stimulating beam is more uniform. A red filter (3 mm SCHOTT OG 590) placed immediately in front of the laser eliminates the weak ultraviolet components in the laser emission. The signal amplitude from the photomultiplier is linear with the intensity of the photostimulating light and with the stored photostimulable energy. The signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $$f(t)=A \cdot e^{-t/\tau};$$

wherein A is the amplitude, $\tau$ is the time constant, t is stimulation time, and e is the base number of a natural logarithm.

The 1/e point is reached when $t=\tau \ln 2$ whereupon half of the stored energy has been released. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated. Because the emission light is scattered in all directions only a fraction of the emitted light is detected by the photomultiplier. The position of the panel and photomultiplier are such that 10% of the total emission is detected by the photomultiplier. After all these corrections have been made a value of conversion efficiency is obtained in pJ/mm2/mR. This value varies with screen thickness and therefore for measurements to be comparable they have to be carried out at constant phosphor coverage.

The photostimulation energy is defined as the energy necessary to stimulate half the stored energy. The units used are $\mu J/mm2$.

In a third measurement the response time is determined. This is measured by stimulating the phosphor screen with short light pulses. The laser light is modulated with an acousto-optical modulator. The rise time of the stimulating light is 15 ns. The emitted light is measured with a photomultiplier (Hamamatsu R 1398) with a small anode resistor (150 ohm) to obtain a wide bandwidth (10 MHz). The rise time of the measurement system itself is 35 ns. The response time is the time to reach half of the maximum intensity of the emitted light and is designated t½.

In a fourth measurement the stimulation spectrum is determined. The light of a tungsten (quartz-iodine) lamp is fed into a monochromator (Bausch and Lomb—W. Germany) and then mechanically chopped with a rotating wheel with a single hole. The lamp provides a continuous spectrum extending from the near UV through the visible spectrum into the infrared. The 33-86-02 grating from Bausch and Lomb is a 1350 line/mm grating covering the visible range from 350 nm to 800 nm in the first order and is blazed at 500 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused due to e.g. the dark curent of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

The present invention is illustrated by the following examples wherein reference is made to curves represented in FIGS. 1 to 18. The examples are not limiting in any way. In the examples the percentages and ratios are by weight unless otherwise mentioned. The atomic weight percentages relate to gram-atom of A' or A" relative to the total gram-atoms of M, M', A' and A".

EXAMPLE 1

3.94680 g of $BaCO_3$, 0.00957 g of $Eu_2O_3$, 0.02850 g of $Gd_2O_3$, 0.66559 g of silica (containing 12.3% of water) and 9.99612 g of $BaBr_2.2H_2O$ were mixed for 10 minutes with 5 ml of ethanol in a planetary ball mill. The mixture was fired in an aluminum oxide boat for 16 hours at 800° C. in an atmosphere of 25 vol % hydrogen and 75 vol % nitrogen yielding $Ba_5SiO_4Br_6$ doped with 0.1 at % $Eu^{2+}$ and 0.3 at % $Gd^{3+}$ as confirmed by XRD analysis.

Figure 1:
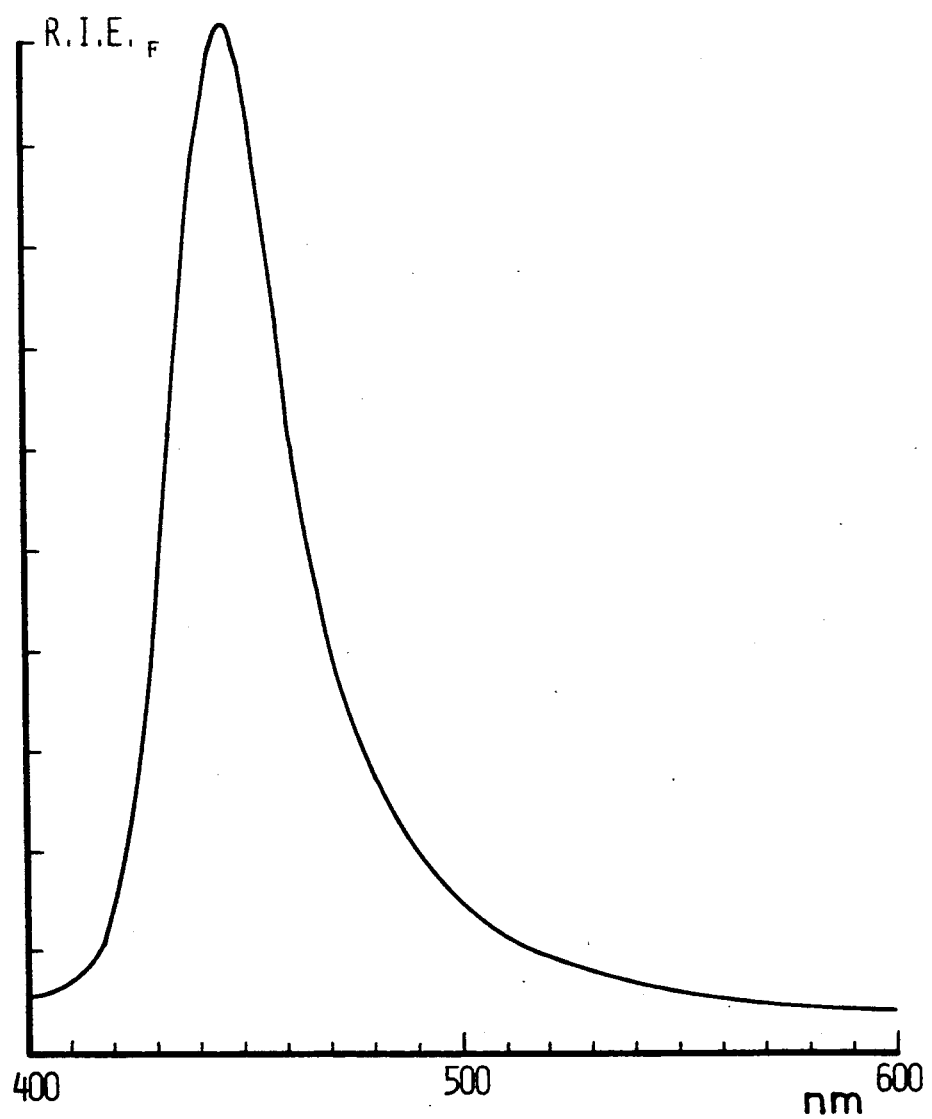
FIGS. 1, 3, 5 and 7 to 11, 13 to 15 and 18 represent "prompt" emission spectra of the phosphors described in the correlated Example. In the diagrams the relative intensity of the fluorescence emission (R.I.E.$_F$) is in the ordinate and the wavelength range in nm is the abscissa.

This sample was then subjected to X-ray excitation and the "prompt" emission spectrum determined. This is characterized by a single emission peak at 443 nm with a half width of about 30 nm as shown in FIG. 1.

The ground powder was then dispersed in a binder solution containing cellulose acetobutyrate dissolved in methyl ethyl ketone. The dispersion obtained was coated onto a 100 μm thick transparent sheet of polyethylene terephthalate to give a coating weight of 500 g/m2. This screen was then used to determine the energy storage characteristics of the phosphor. After erasing any residual stored energy by irradiating with white light filtered to remove the UV-components, the screen was irradiated with a given dose of X-rays and then stimulated with He-Ne laser light (633 nm) applying for photodetection of almost only the emitted light a 5 mm HOYA B 390 filter. A conversion efficiency of 4.2 pJ/mm2/mR and a stimulation energy of 300 μJ/mm2 were obtained.

On stimulating with argon ion laser emitting a 514 nm line the stimulating light before photodetection was removed almost completely by a 5 mm SCHOTT BG 3 filter without substantially attenuating the emitted light. With the same stimulating light intensity the stimulated light obtained with 514 nm stimulation for a given irradiation was double that obtained with He-Ne laser (633 nm) stimulation.

Figure 2:
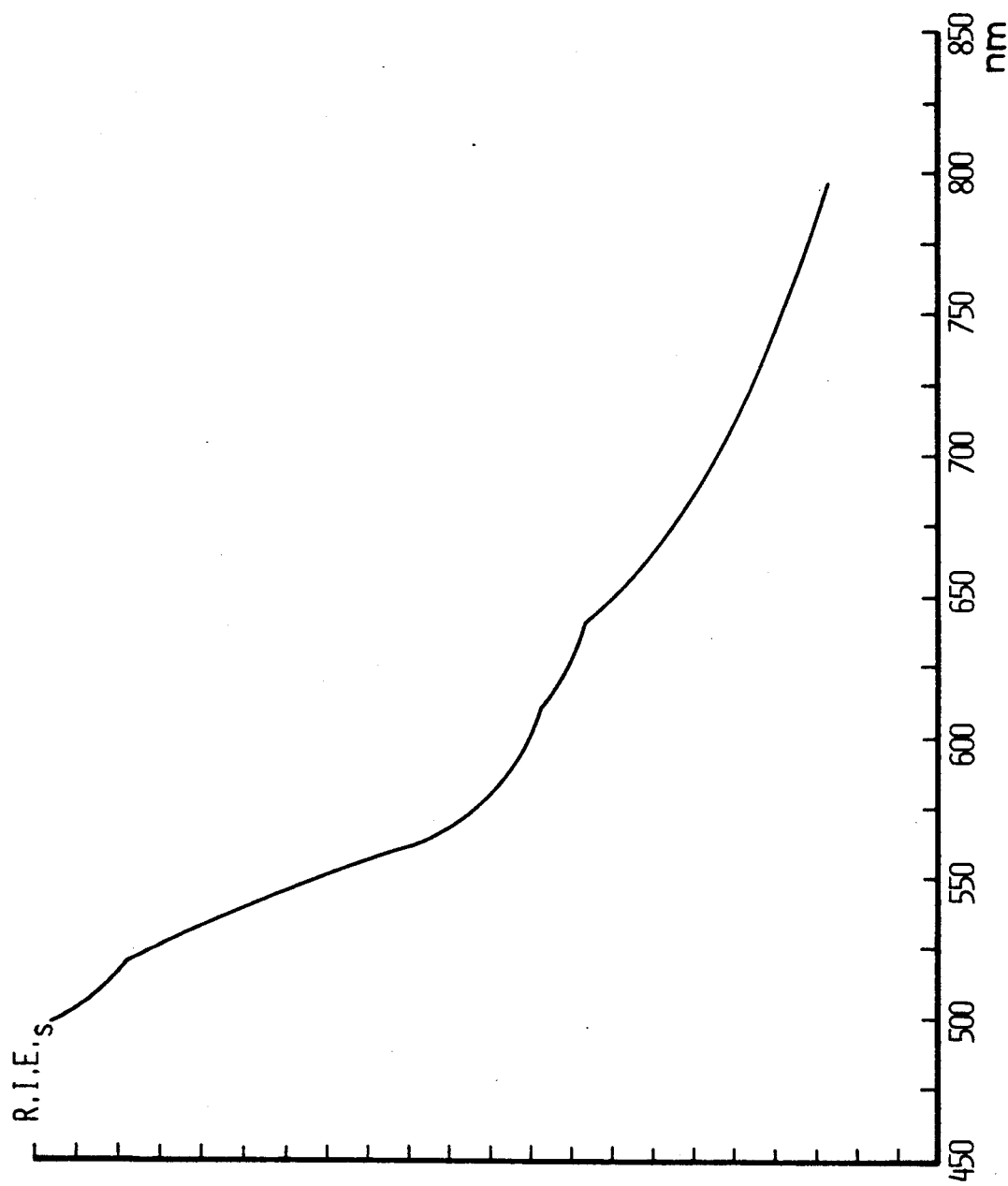
FIGS. 2, 4, 6, 12, 16 and 17 represent stimulation spectra of the phosphors described in the correlated Example. In the diagrams the relative intensity of the stimulation emission (R.I.E.$_S$) at peak wavelength (see prompt emission spectrum) is in the ordinate and the wavelength of the stimulating light in nm is in the abscissa.

This is in accordance with the stimulation spectrum of this phosphor shown in FIG. 2 wherefrom can be derived that the ratio of stimulated intensity for stimulation at 514 nm and 633 nm respectively is about 2:1.

The response time of this phosphor screen was then determined by stimulating the irradiated screen with short laser light pulses from an argon ion laser as described in the text above. The response time being the time to reach half of the maximum energy of emitted light and designated t½ was 0.53 μs.

EXAMPLE 2

3.94704 g of $BaCO_3$, 0.00898 g of $Eu_2O_3$, 0.66526 g of silica (containing 12.3 at % water) and 12.00013 g of $BaBr_2.2H_2O$ were mixed with 5 ml of ethanol in a planetary ball mill with for 10 minutes. The quantity of $BaBr_2.2H_2O$ used was about 20% in excess of the stoichiometric quantity. The mixture was fired in an aluminium oxide boat for 1 hour at 300° C. and then 30 hours at 800° C. in an atmosphere of 25 vol % of hydrogen and 75 vol % of nitrogen yielding $Ba_5SiO_4Br_6$ doped with 0.1 at % Eu as confirmed by XRD analysis.

The prompt emission spectrum of this phosphor was measured as described in Example 1 and was similar to that of Example 1. The conversion efficiency and stimulation energy for stimulation with a He-Ne laser (633 nm) was determined as described in Example 1 and were 2.17 pJ/mm2mR and 68 μJ/mm2 respectively.

The stimulation spectrum for this phosphor was determined as described in Example 1 and was also similar to that for Example 1.

EXAMPLES 3 to 7

The phosphors of examples 3 to 7 were prepared using similar techniques to that for example 2 with the addition of appropriate quantities of gadolinium oxide before firing yielding phosphors with gadolinium coactivator concentrations of 0.1 at %, 0.3 at %, 0.5 at %, 1 at % and 3 at % respectively.

The prompt emission spectra of these phosphors were similar to that of example 1. Screens were cast with these phosphors as described in example 1. The conversion efficiencies and stimulation energies for 633 nm stimulation were determined as described in Example 1 and are summarized in Table 1.

TABLE 1

| | for 633 nm stimulation | | |
|---|---|---|---|
| Example No. | Gadolinium concentration [at %] | Conversion efficiency [pJ/mm2/mR] | Stimulation energy [μJ/mm2] |
| 2 | 0 | 2.17 | 68 |
| 3 | 0.1 | 3.01 | 85 |
| 4 | 0.3 | 3.65 | 99 |
| 5 | 0.5 | 2.70 | 80 |
| 6 | 1 | 2.11 | 82 |
| 7 | 3 | 0.92 | 90 |

EXAMPLES 8 to 13

The phosphors of examples 8 to 13 were prepared using similar techniques to that for example 2 with the addition of an appropriate quantity of gadolinium oxide before firing yielding phosphors with gadolinium coactivator concentrations of 0.5 at % and with europium concentrations of 0.002 at %, 0.005 at %, 0.02 at %, 0.05 at %, 0.1 at %, 2 at % and 5 at % respectively instead of 0.1 at %.

The prompt emission spectra of these phosphors were similar to that of example 1. Screens were cast with these phosphors as described in example 1. The conversion efficiencies and stimulation energies for 633 nm stimulation were determined as described in example 1 and are summarized in Table 2.

TABLE 2

| | for 633 nm stimulation | | |
|---|---|---|---|
| Example No. | Europium concentration [at %] | Conversion efficiency [pJ/mm2/mR] | Stimulation energy [μJ/mm2] |
| 8 | 0.002 | 0.20 | 126 |
| 9 | 0.005 | 0.53 | 122 |
| 10 | 0.02 | 0.88 | 72 |
| 11 | 0.05 | 2.13 | 75 |

TABLE 2-continued

| | for 633 nm stimulation | | |
|---|---|---|---|
| Example No. | Europium concentration [at %] | Conversion efficiency [pJ/mm2/mR] | Stimulation energy [μJ/mm2] |
| 5 | 0.1 | 2.70 | 80 |
| 12 | 2 | 2.38 | 70 |
| 13 | 5 | 2.10 | 70 |

EXAMPLES 14 to 17

The phosphors of examples 14 to 17 were prepared using similar techniques to that for example 2 with the addition of 0.5 at % of yttrium, 0.5 at % of lanthanum, 0.5 at % lutetium and 0.5 at % of samarium respectively.

The prompt emission spectra of these phosphors were similar to that of example 1. Screens were cast with these phosphors as described in example 1. The conversion efficiencies and stimulation energies for 633 nm stimulation were determined as described in example 1 and are summarized in Table 3.

TABLE 3

| | | for 633 nm stimulation | |
|---|---|---|---|
| Example No. | A" | Conversion efficiency [pJ/mm2/mR] | Stimulation energy [μJ/mm2] |
| 2 | — | 2.17 | 68 |
| 14 | Y | 2.56 | 73 |
| 15 | La | 1.95 | 67 |
| 5 | Gd | 2.70 | 80 |
| 16 | Lu | 3.81 | 70 |
| 17 | Sm | 2.75 | 71 |

The change in co-activator had little effect on the prompt emission spectra of these phosphors determined as described in example 1. The stimulation spectra for these phosphors measured as described in example 1 were similar to that of example 1.

EXAMPLE 18

3.94280 g of $BaCO_3$, 0.00491 g of $Eu_2O_3$, 0.02418 g of $La_2O_3$, 0.66435 g of silica (containing 12.3 wt % of water) and 12.0 g of $BaBr_2.2H_2O$ were mixed with 5 ml of ethanol in a planetary ball mill for 10 minutes. The quantity of $BaBr_2.2H_2O$ used was about 20% in excess of the stoichiometric quantity. The mixture was fired in an aluminium oxide boat for 32 hours at 800° C. in an atmosphere of 25 vol % of hydrogen and 75 vol % of nitrogen yielding $Ba_5SiO_4Br_6$ doped with 0.05 at % $Eu^+$ and 0.3 at % $La^{3+}$ as confirmed by XRD analysis.

The prompt emission spectrum of this phosphor was similar to that of example 1. A screen was cast with this phosphor as described in example 1. The conversion efficiency and stimulation energy for 633 nm stimulation were determined as described in example 1 and were 3.8 pJ/mm2/mR and 270 μJ/mm2 respectively.

EXAMPLE 19

2.95265 g of $SrCO_3$, 0.00867 g of $Eu_2O_3$, 0.04552 g of $Gd_2O_3$, 0.66552 g of silica (containing 12.3 wt % of water) and 9.600 g of $SrCl_2.6H_2O$ were mixed with 5 ml of ethanol in a planetary ball mill for 10 minutes. The quantity of $SrCl_2.6H_2O$ used was about 20% in excess of the stoichiometric quantity. The mixture was fired in an aluminium oxide boat for 2 hours at 250° C. and then 30 hours at 800° C. in an atmosphere of 25 vol % of hydrogen and 75 vol % of nitrogen yielding $Sr_5SiO_4Cl_6$ doped with 0.1 at % $Eu^{2+}$ and 0.5 at % $Gd^{3+}$ as confirmed by XRD-analysis.

Figure 3:
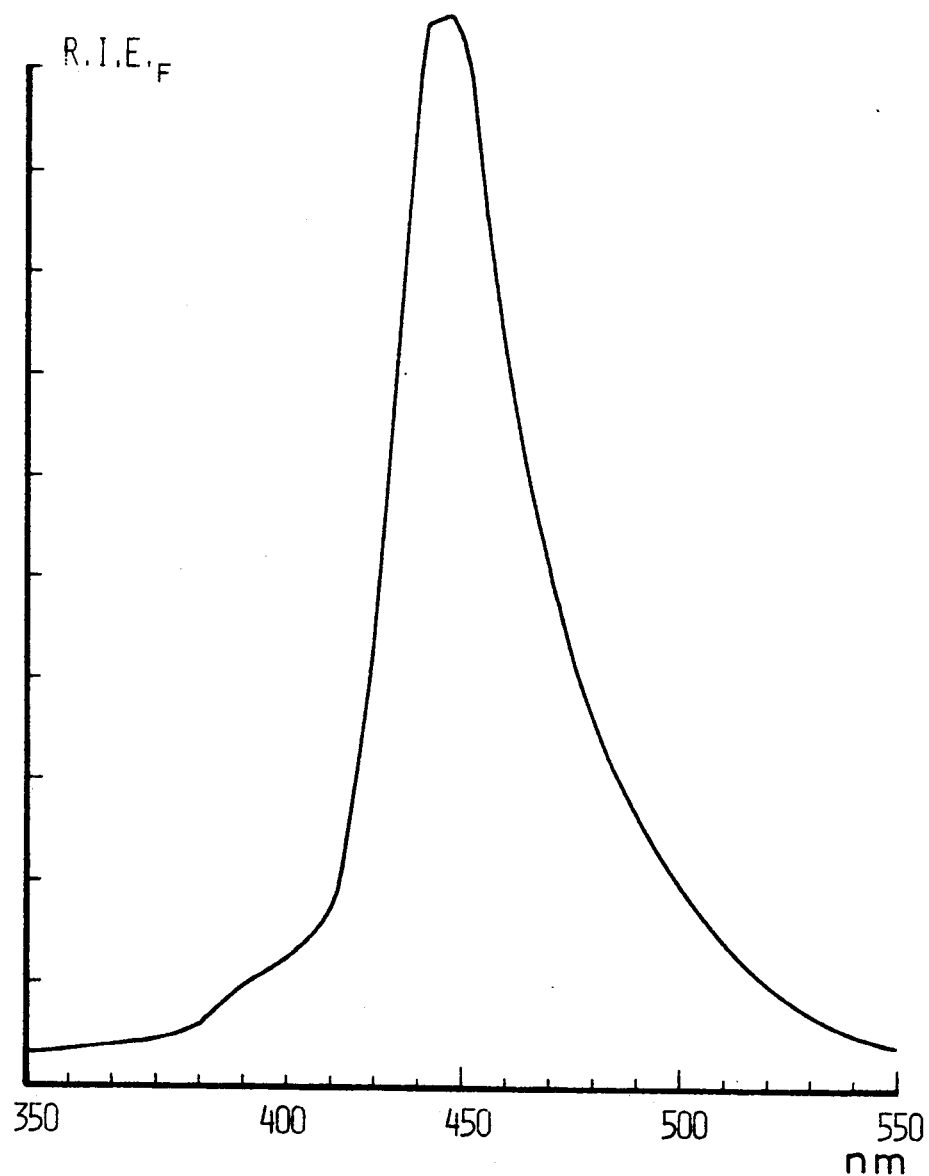

The prompt emission spectrum of this phosphor was determined as described hereinbefore and is shown in FIG. 3. The spectrum is characterized by an emission peak at about 447 nm with a half width of about 37 nm. There is also a neglegible $Gd^{3+}$ peak at 313 nm.

A screen was cast with this phosphor as described in example 1. The conversion efficiency and stimulation energy for 633 nm stimulation were determined as described in example 1 and were 1.29 pJ/mm2/mR and 724 μJ/mm2 respectively. The stimulation energy for 514 nm stimulation was also determined as described in example 1 and was 130 μJ/mm2.

The response time of this phosphor was then determined by stimulating the irradiated screen with short laser light pulses from an argon ion laser as described in the text. A $t\frac{1}{2}$ value of 760 μs was found for the emission of this phosphor.

Figure 4:
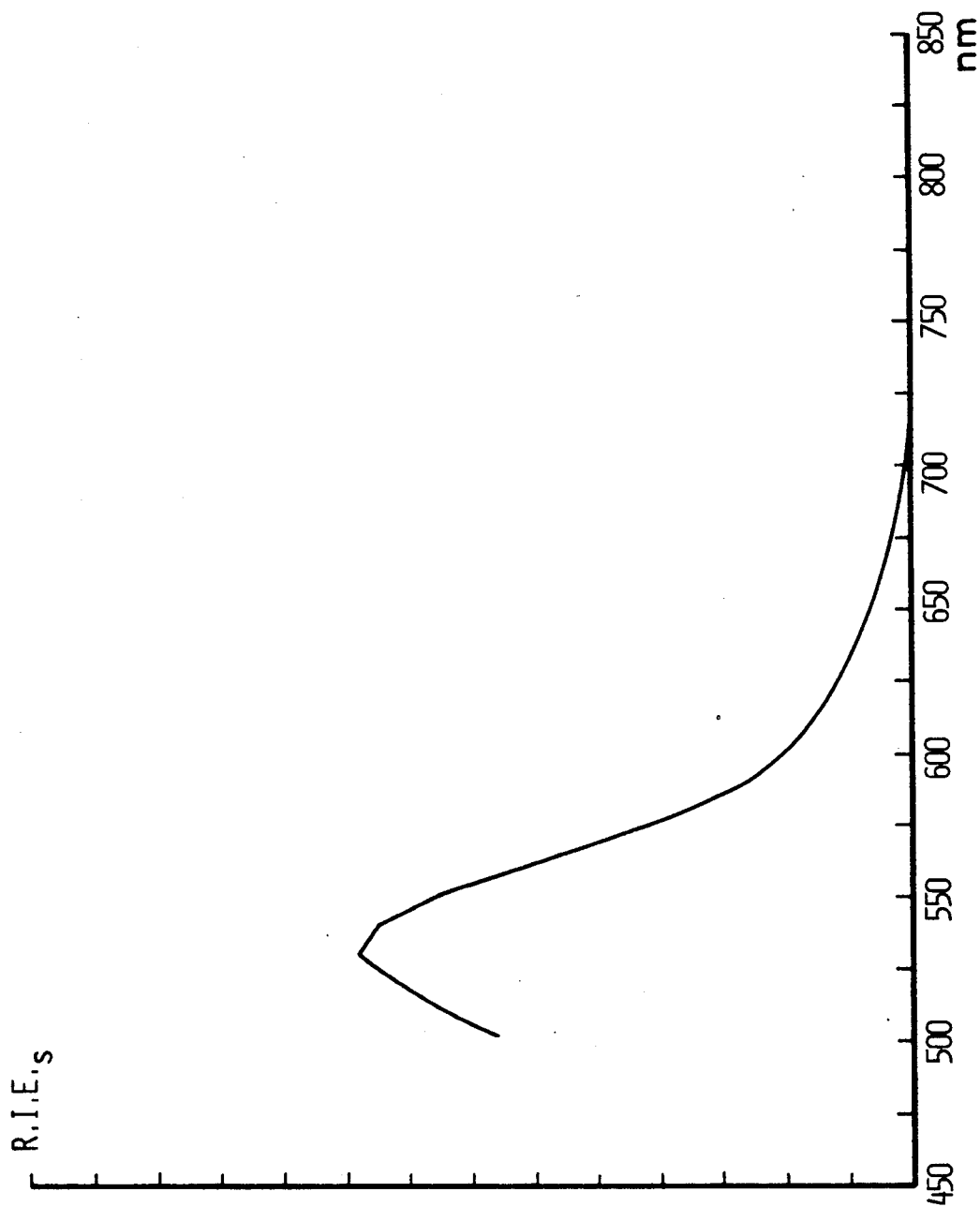

Finally the stimulation spectrum of this phosphor was determined as described hereinbefore. Said spectrum is shown in FIG. 4 and exhibits a peak at 530 nm. The ratio of stimulated intensity for stimulation at 514 nm to 633 nm of about 8 is consistent with the factor of about 6 in stimulation energy for stimulation at 514 nm and 633 nm.

EXAMPLE 20

3.94743 g of $BaCO_3$, 0.00874 g of $Eu_2O_3$, 0.66596 g of silica (containing 12.3 wt % of water), 0.04555 g of gadolinium oxide, 3.802 g of $BaCl_2$ and 6.010 g of $BaBr_2.2H_2O$ were mixed with 5 ml of ethanol in a planetary ball with for 10 minutes. The quantity of barium halides used was about 20% in excess of the stoichiometric quantities. The mixture was fired in an aluminium oxide boat for 1 hour at 300° C. and 30 hours at 800° C. in an atmosphere of 25% by vol. of hydrogen and 75% by vol. of nitrogen, yielding $Ba_5SiO_4Cl_3Br_3$ doped with 0.1 at % $Eu^{2+}$ and 0.5 at % $Gd^{3+}$ as confirmed by XRD analysis.

Figure 5:
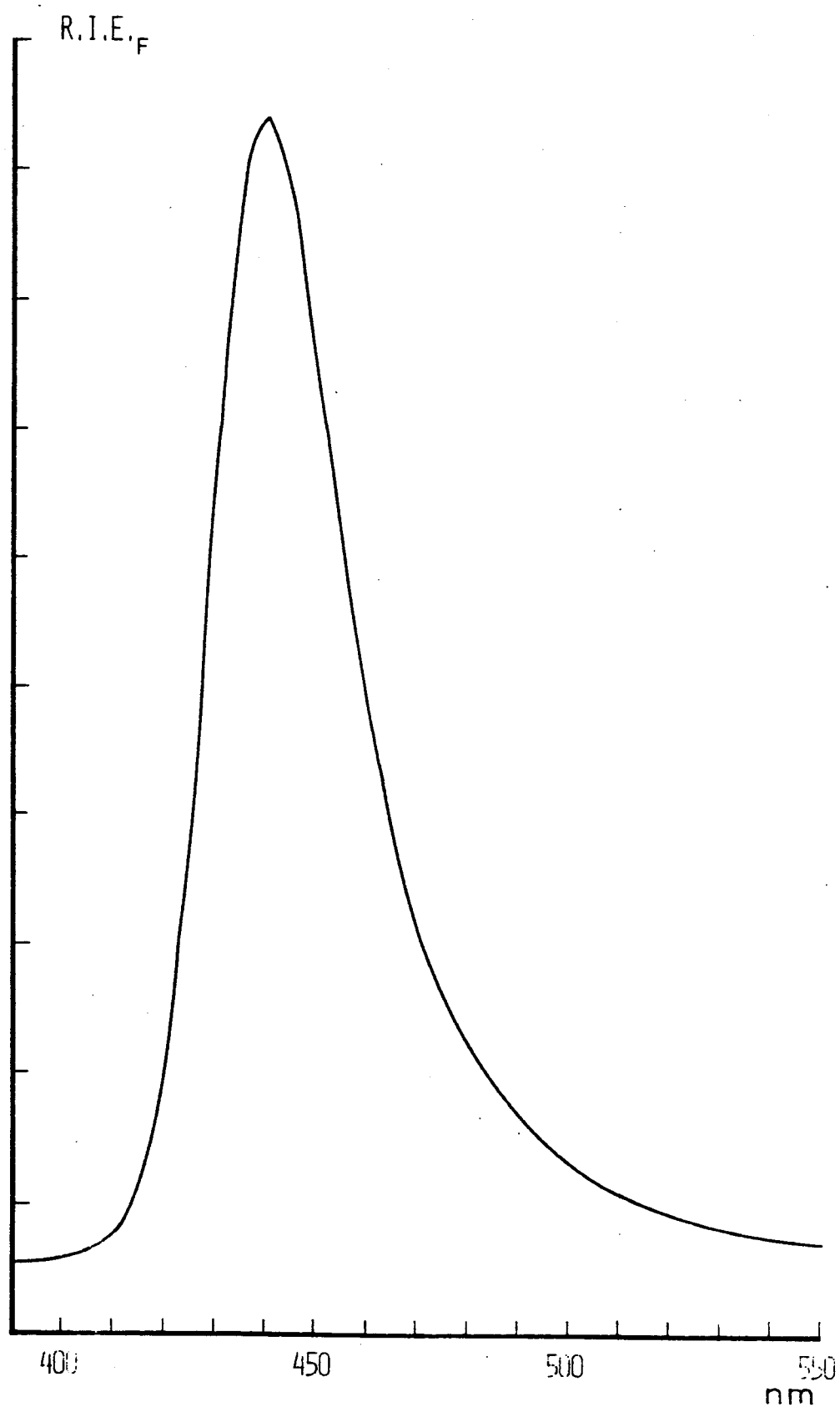

The prompt emission of this phosphor determined as described in example 1 is shown in FIG. 5. This is characterized by an emission peak 438 nm with a half width of about 32 nm.

A screen was cost with this phosphor as described in example 1. The conversion efficiency and stimulation for 633 nm stimulation were determined as described in example 1 and were 0.76 pJ/mm²/mR and 240 μJ/mm² respectively.

Figure 6:
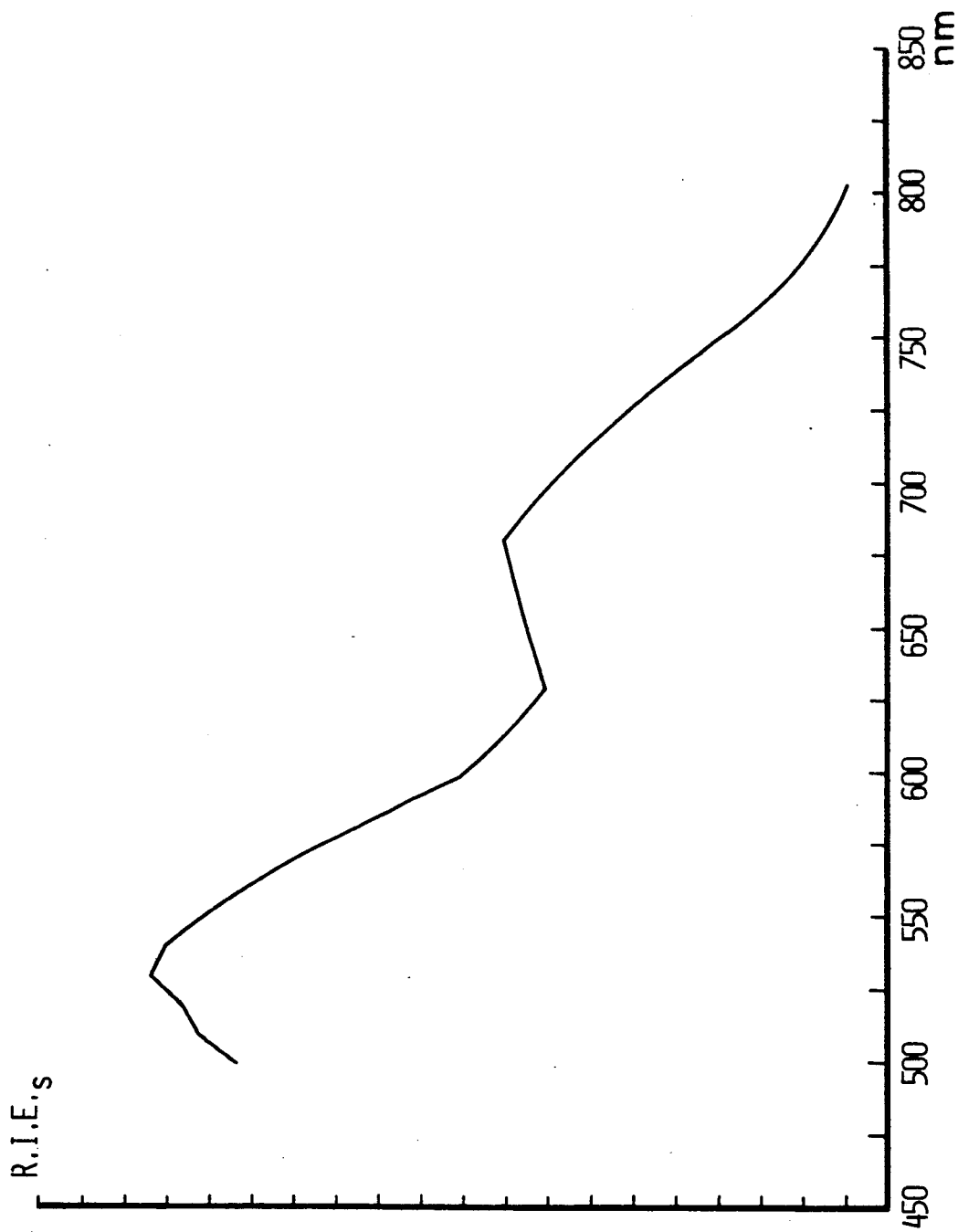

The stimulation spectrum for this phosphor was determined as described in example 1 and this is shown in FIG. 6. Finally the response time of this phosphor was determined as described in Example 1. A $t\frac{1}{2}$ value of 0.40 μs was found.

EXAMPLE 21

3.94748 g of $BaCO_3$, 0.00898 g of $Eu_2O_3$, 0.66684 g of silica (containing 12.3 wt % of water) and 7.32925 g of $BaCl_2.2H_2O$ were mixed with 5 ml of ethanol in a planetary ball mill for 10 minutes. The quantity of $BaCl_2.2H_2O$ was stoichiometric. The mixture was fired in an aluminium oxide boat for 30 hours at 800° C. in an atmosphere of 25% by vol. of hydrogen and 75% by vol. of nitrogen yielding $Ba_5SiO_4Cl_6$ doped with 0.1 at % $Eu^{2+}$ as confirmed by XRD analysis.

Figure 7:
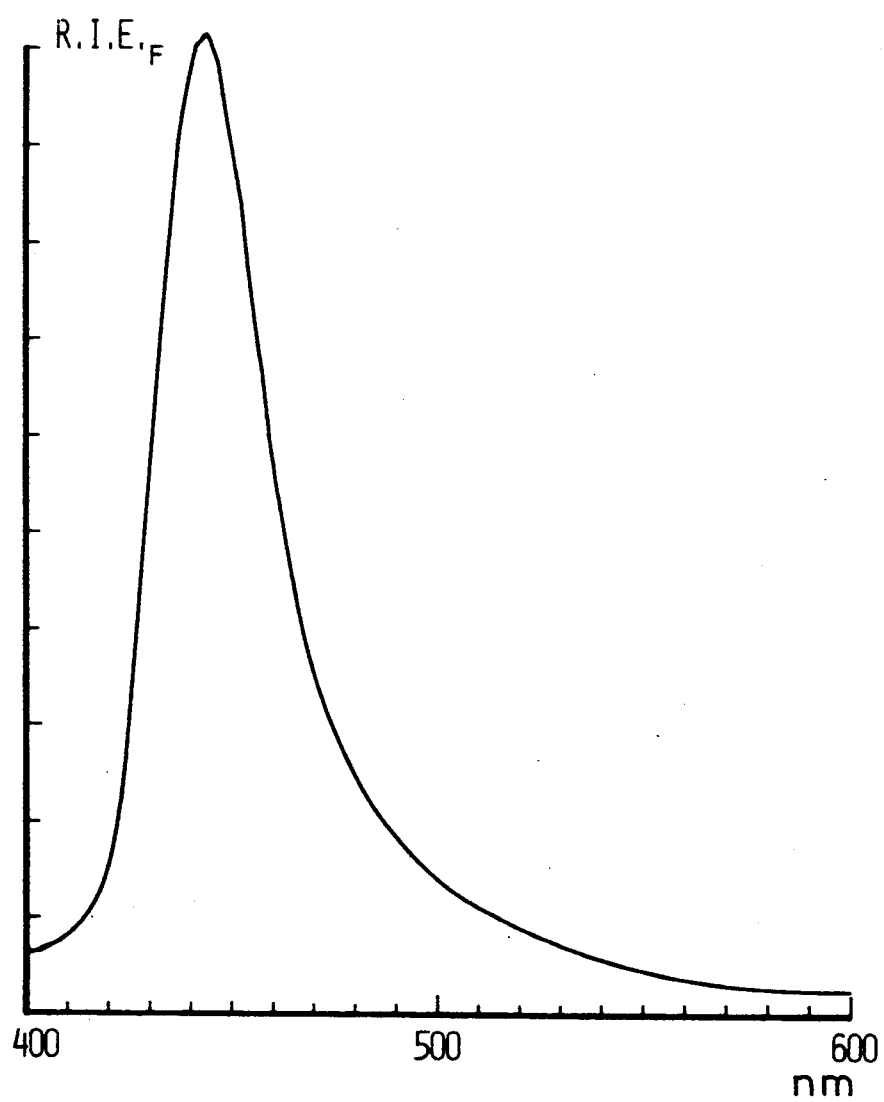

The prompt emission spectrum of this phosphor determined as described in example 1 is shown in FIG. 7.

This is characterised by an emission peak at 444 nm with a half width of about 33 nm.

A screen was cast with this phosphor as described in example 1. The conversion efficiency and stimulation energy for 633 nm stimulation were determined as described in example 1 and were 0.006 pJ/mm2/mR and 461 μJ/mm2 respectively.

EXAMPLE 22

13.16 g of $BaCO_3$, 0.04 g of $EuF_3$, 2.00 g of silica, 24.43 g of $BaCl_2.2H_2O$ and 39.63 g of $(NH_4)_2CO_3$ were mixed well in a large mortar and then shaken well in a bottle. The mixture was then placed in a quartz crucible without a lid. The quartz crucible was then placed in a mullite (alumino-silicate) crucible, which had charcoal in it. The mullite crucible was covered and placed in a box furnace with the furnace at 250° C. It was fired at 800° C. for 3 hours and taken out when still hot and allowed to cool. It was then placed in the furnace at 800° C. and refired at 800° C. under the same conditions for 6 hours and taken out at 800° C. and allowed to cool. Finally it was placed in the furnace at 800° C. under the same conditions and refired at 800° C. for 4 hours and taken out with the furnace still at temperature making a total of 13½ hours firing at 800° C. $Ba_5SiO_4Cl_6$ doped with 0.11 at % $Eu^{2+}$ is thus formed as confirmed by XRD analysis.

The prompt emission of this spectrum determined as described in example 1 was identical to that shown in FIG. 7.

A screen was cast with this phosphor as described in example 1. The conversion efficiency and stimulation energy for 633 nm stimulation were determined as described in example 1 and were 0.003 pJ/mm2/mR and 90 uJ/mm2 respectively.

EXAMPLE 23

3.94853 g of $BaCO_3$, 0.00152 g of $Eu_2O_3$, 0.024979 g of $La_2O_3$, 0.66600 g of silica (containing 12.3 wt % water) and 7.33166 g of $BaCl_2.2H_2O$ were mixed with 5 ml of ethanol in a planetary ball mill for 10 minutes. The quantity of $BaCl_2.2H_2O$ was stoichiometric. The mixture was fired in an aluminium oxide boat for 30 hours at 800° C. in an atmosphere of 25 vol % of hydrogen and 75 vol % of nitrogen yielding $Ba_5SiO_4Cl_6$ co-doped with 0.02 at % $Eu^{2+}$ and 0.3 at % $La^{3+}$ as confirmed by XRD analysis.

The prompt emission spectrum of this phosphor determined as described hereinbefore was similar to that for the phosphor described in example 23.

A screen was cast with this phosphor as described in example 1. The conversion efficiency and stimulation energy for 633 nm stimulation were determined as described in example 1 and were 0.52 pJ/mm2/mR and 2000 μJ/mm2 respectively.

The response time of this phosphor was then determined by stimulating the irradiated screen with short laser light pulses from an argon ion laser as described hereinbefore. A t½ of 1 μs was found for the emission of this phosphor.

EXAMPLE 24

13.16 g of $BaCO_3$, 0.04 g of $EuF_3$, 2.23 g of silica hydrate, 24.43 g of $BaCl_2.2H_2O$ and 39.85 g $(NH_4)_2CO_3$ were mixed and blended in a large mortar and then shaken well in a bottle. The mixture was then placed in a quartz crucible with a lid and the crucible placed in a larger mullite crucible a quarter filled with charcoal. The mullite crucible was covered with a lid, placed in a cool box furnace and then fired at 800° C. for 1 hour. After cooling 2.0 g $NH_4Cl$ were added and the mixture reground. The mixture was then replaced in the furnace at 800° C. and refired under the same conditions for 3 hours and taken out with the furnace still at temperature. After regrinding, the mixture was placed in an uncovered quartz crucible, which was placed in a mullite crucible on a bed of fresh charcoal. The crucible was covered placed in a cool furnace, fired at 800° C. for 4 hours and taken out of the furnace, while the furnace was still at temperature making a total of 8 hours firing at 800° C. The phosphor formed consisted of a mixture of about 60 mol % of $Ba_5Si_2O_6Cl_6$ and about 40 mol % of $Ba_5SiO_4Cl_6$ doped with 0.1 at % $Eu^{2+}$ as confirmed by XRD analysis.

Figure 8:
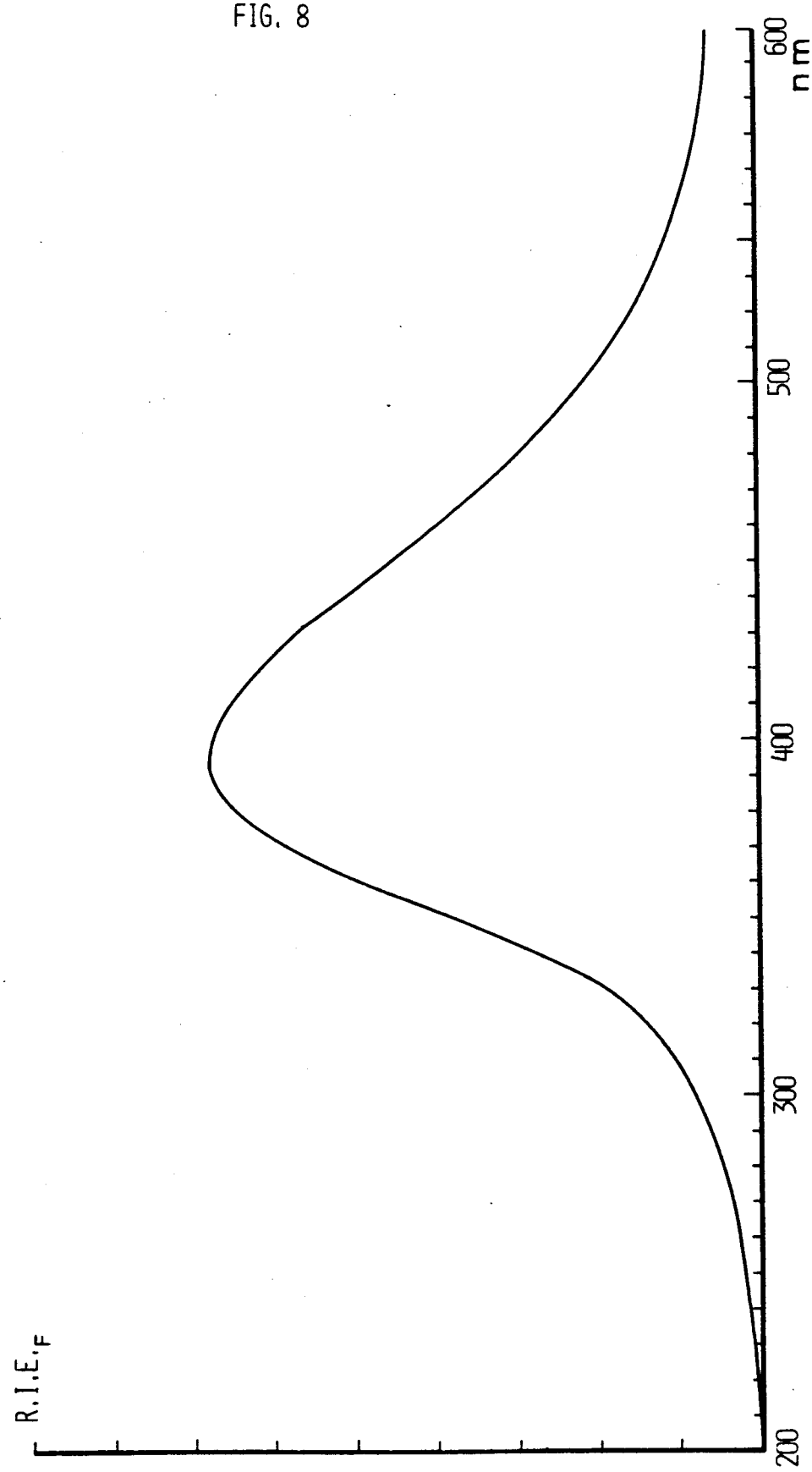

The prompt emission spectrum of this phosphor was determined as described in example 1 and is shown in FIG. 8. This is characterized by an emission peak at 395 nm with a half width of about 105 nm.

A screen was cast with this phosphor as described in example 1. The conversion efficiency and stimulation energy for 633 nm stimulation were determined as described in example 1 and were 0.017 pJ/mm2/mR and 1500 μJ/mm2 respectively.

EXAMPLE 25

13.16 g of $BaCO_3$, 0.04 g of $EuF_3$, 2.00 g of silica, 24.43 g of $BaCl_2.2H_2O$ and 39.63 g of $(NH_4)_2CO_3$ were mixed and blended in a large mortar and then shaken well in a bottle. The mixture was then placed in a quartz crucible with a lid and placed in a mullite crucible being a quarter filled with charcoal. The mullite crucible was covered with a lid and placed in a cool box furnace and then fired at 800° C. for 1 hour. After cooling 2.0 g of $NH_4Cl$ were added and the mixture reground. The mixture was then replaced in the furnace at 800° C., refired under the same conditions for 3 hours and taken out of the furnace at temperature. After regrinding, the mixture was placed in an uncovered crucible on a bed of fresh charcoal. The crucible was covered, placed in a cool furnace, fired at 800° C. for 4 hours and taken out with the furnace at temperature making a total of 8 hours firing at 800° C. The phosphor formed consisted of a mixture of about 80 mol % $Ba_5Si_2O_6Cl_6$ and about 20 mol % $Ba_5SiO_4Cl_6$ doped with 0.1 at % $Eu^{2+}$ as confirmed by XRD analysis.

Figure 9:
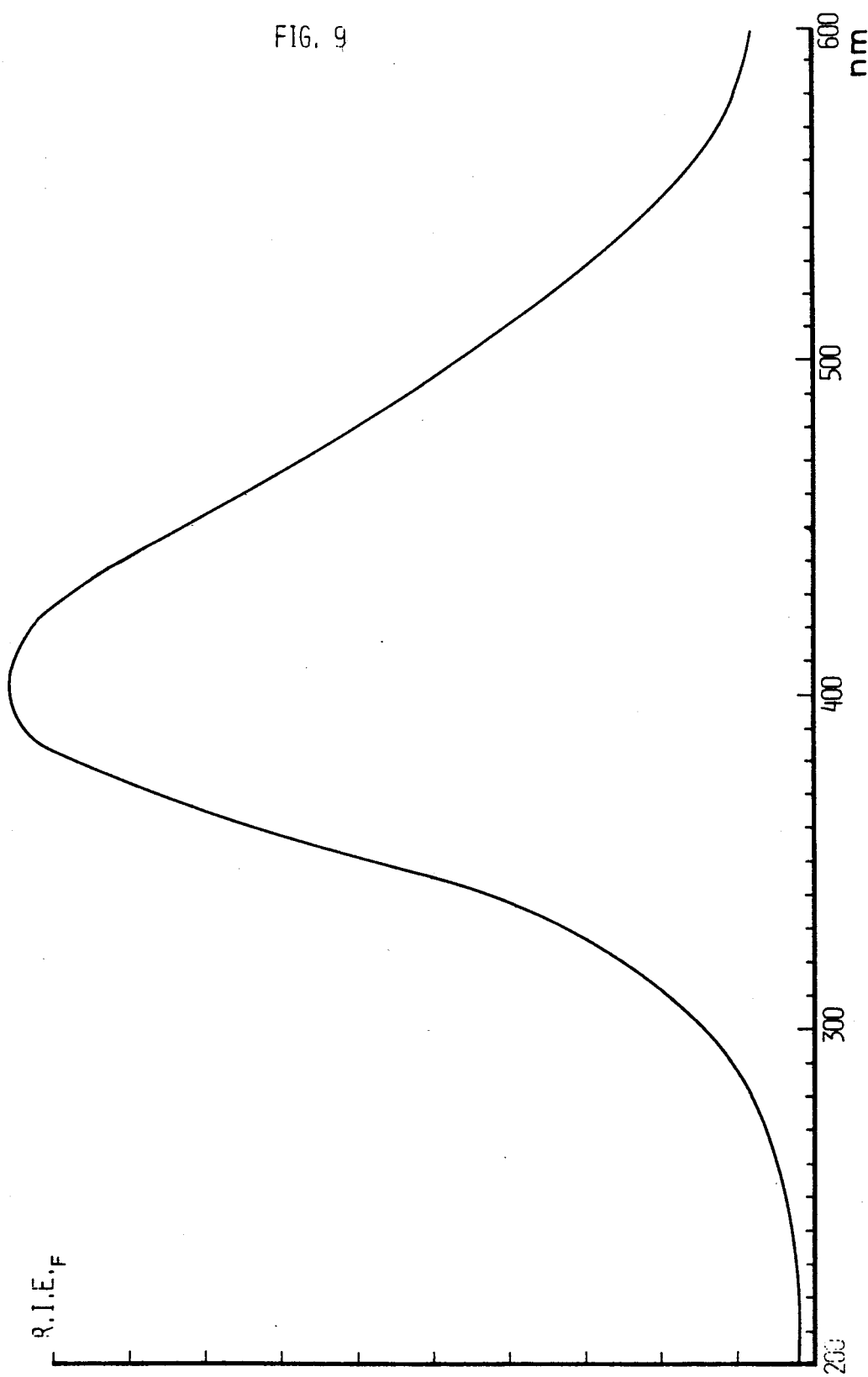

The prompt emission spectrum of this phosphor was determined as described in example 1 and is shown in FIG. 9. This is characterized by an emission peak at 406 nm with a half width of about 143 nm.

A screen was cast with this phosphor as described in example 1. The conversion efficiency and stimulation energy for 633 nm stimulation were determined as described in example 1 and were 0.05 pJ/mm$^2$/mR and 360 μJ/mm$^2$ respectively.

The response time of this phosphor was then determined by stimulating the irradiated screen with short laser light pulses from an argon ion laser as described in example 1. A t½ of 0.38 μs was found for the emission of this phosphor.

EXAMPLE 26

21.93 g of $BaCO_3$, 0.03 g of $CeO_2$, 3.3 g of silica, 40.71 g of $BaCl_2.2H_2O$ and 66.0 g of $(NH_4)_2CO_3$ were mixed and blended in a large mortar and then shaken well in a bottle. The mixture was then placed in an alumina crucible and placed on top of fresh charcoal in a mullite crucible. The covered mullite crucible was placed in a cool furnace and fired at 800° C. for 7 hours after which it was removed from the furnace and allowed to cool. It was then reground, placed in the furnace at 911° C., refired for 6 hours at 911° C. under the same conditions taken out of the furnace at temperature. The product consisted of about 67 mol % $Ba_5Si_2O_6Cl_6$ and 33 mol % of $BaCl_2$ doped with 0.06 at % $Ce^{3+}$ as confirmed by XRD analysis.

Figure 10:
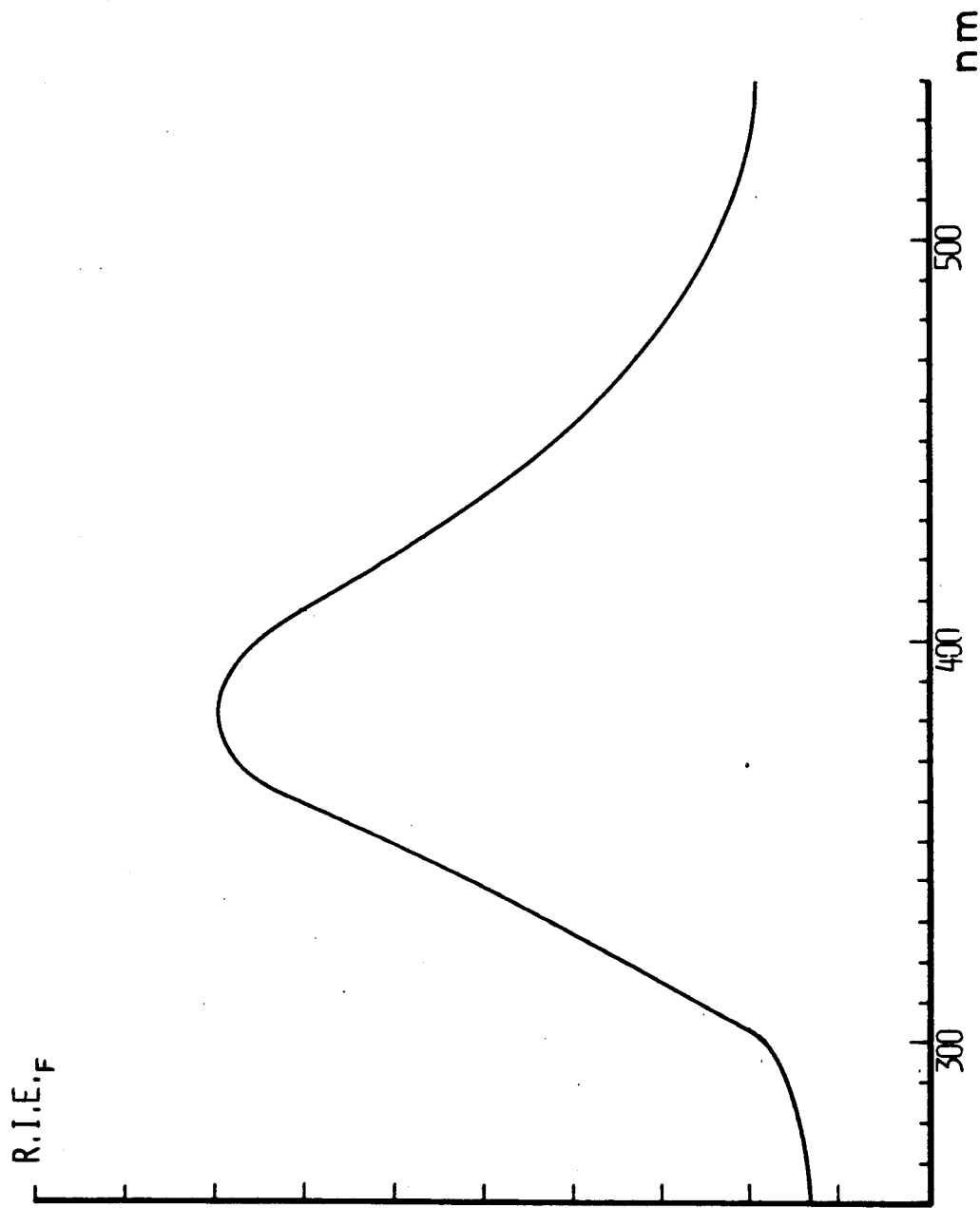

The prompt emission spectrum of this phosphor determined as described in example 1 is shown in FIG. 10. This is characterized by an emission peak at 380 nm with a half width of about 71 nm.

A screen was cast with this phosphor as described in example 1. The conversion efficiency and stimulation energy for 633 nm stimulation were determined as described in example 1 and were 0.06 pJ/mm2/mR and 150 μJ/mm2 respectively.

The response time of this phosphor was then determined by stimulating the irradiated screen with short laser light pulses from an argon ion laser as described in example 1. A t½ of 1.7 μs was found for the emission of this phosphor.

EXAMPLE 27

1.477 g of coprecipitated $Sr_{0.998}Eu_{0.002}CO_3$, 1.9818 g of anhydrous $SrCl_2$, 0.3305 g of $SiO_2$ containing 9.08 at % $H_2O$ and 1.9 ml of ethanol were mixed with agate balls in an agate grinding beaker in a planetary ball mill at maximum speed for 15 minutes. Once milled the resulting paste was dried for approximately 10 minutes in a drying oven at approximately 70° C. to evaporate the ethanol. The mixture was then placed in an alumina crucible and fired in a nitrogen atmosphere for 1 hour at 800° C. The mixture was heated up with the furnace at 600° C./hr and cooled with the furnace at 300° C./hr to 400° C. after which the heating of the furnace was switched off and the mixture was allowed to cool naturally with the furnace. The product consisted of $Sr_5SiO_4Cl_6:Eu^{2+}$ as confirmed by XRD analysis.

Figure 11:
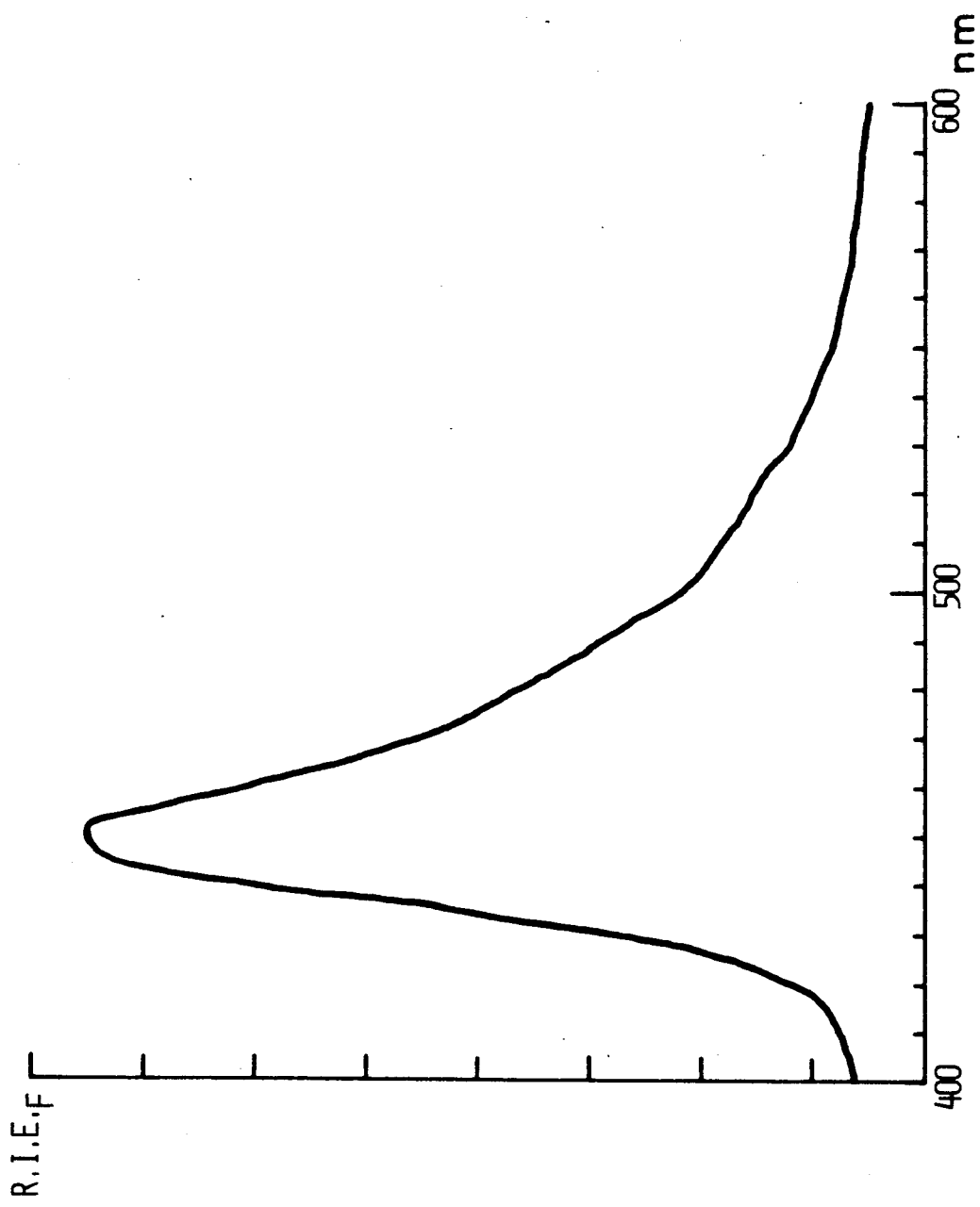

The prompt emission spectrum determined as described in example 1 is shown in FIG. 11. This is characterized by an emission peak at 450 nm with a half width of about 43 nm.

A screen was cast with this phosphor as described in example 1. The conversion efficiency and stimulation energy for 633 nm stimulation were determined as described in example 1 and were 19.6 pJ/mm2/mR and 2250 μJ/mm2 respectively. The stimulation energy for 543 nm stimulation determined by using the green He-Ne laser line was found to be only 54 μJ/mm2.

Figure 12:
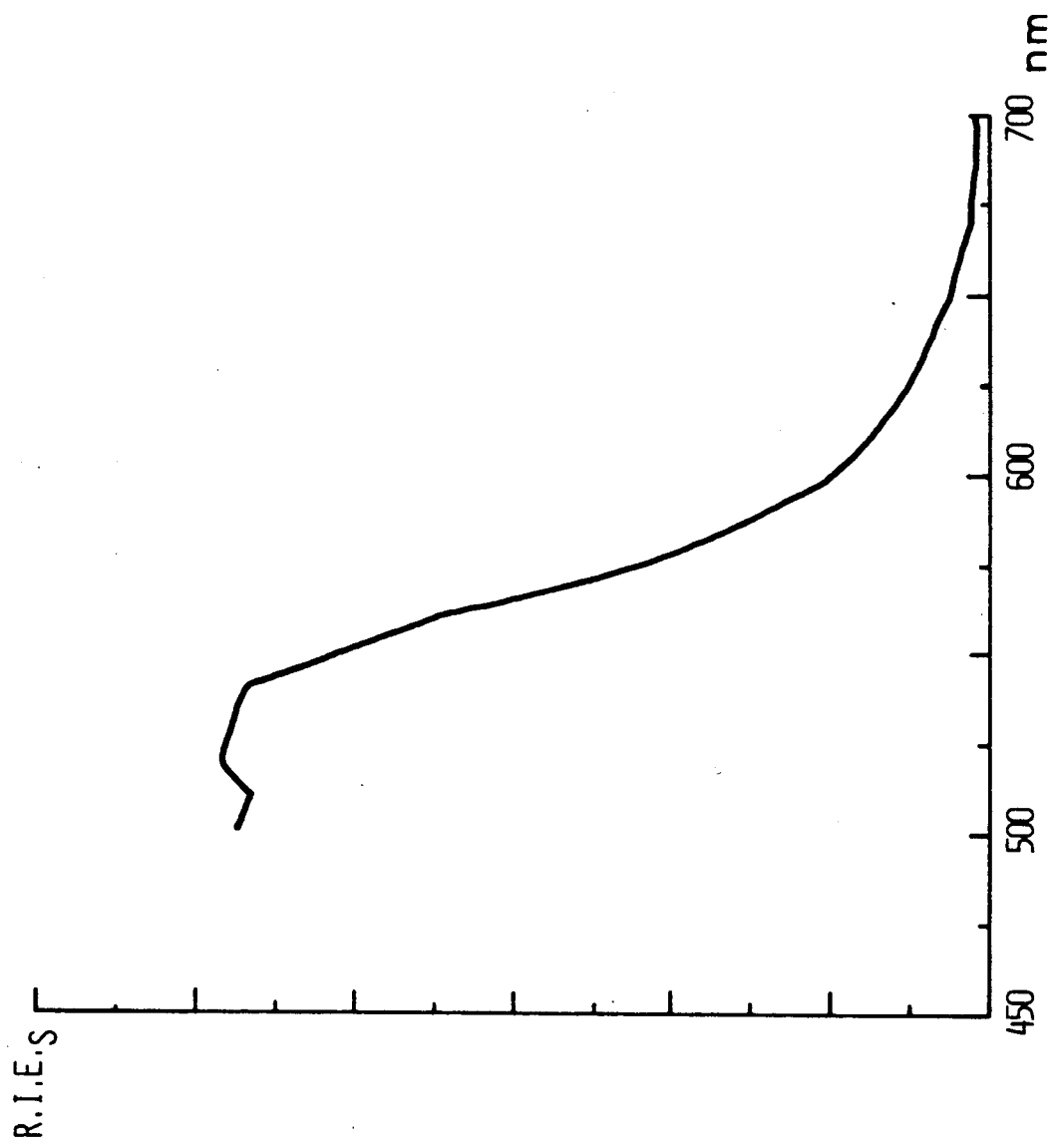

The stimulation spectrum of this phosphor was determined as described in example 1 and is shown in FIG. 12.

EXAMPLE 28

3.0475 g of coprecipitated $Sr_{0.998}Eu_{0.002}CO_3$, 1.6846 g of anhydrous $SrCl_2$, 0.8259 g of $SiO_2$ containing 9.08 wt % $H_2O$ and 2.8 ml of ethanol were mixed with agate balls in an agate grinding beaker in a planetary ball mill at maximum speed for 15 minutes. Once milled the resulting paste was dried for approximately 10 minutes in a drying oven at approximately 70° C. to evaporate the alcohol. The mixture was then placed in an alumina crucible and fired in an atmosphere of 99.8% nitrogen and 0.2% hydrogen at 925° C. for 1 hour. The mixture was heated up with the furnace at 600° C./hr and cooled with the furnace at 300° C./hr to 400° C. after which the heating of the furnace was switched off and the mixture allowed to cool naturally with the furnace. The product consisted of $Sr_5Si_2O_7Cl_4:Eu^{2+}$ as confirmed by XRD analysis. No $Sr_5SiO_4Cl_6:Eu$ phase was detected by XRD analysis.

Figure 13:
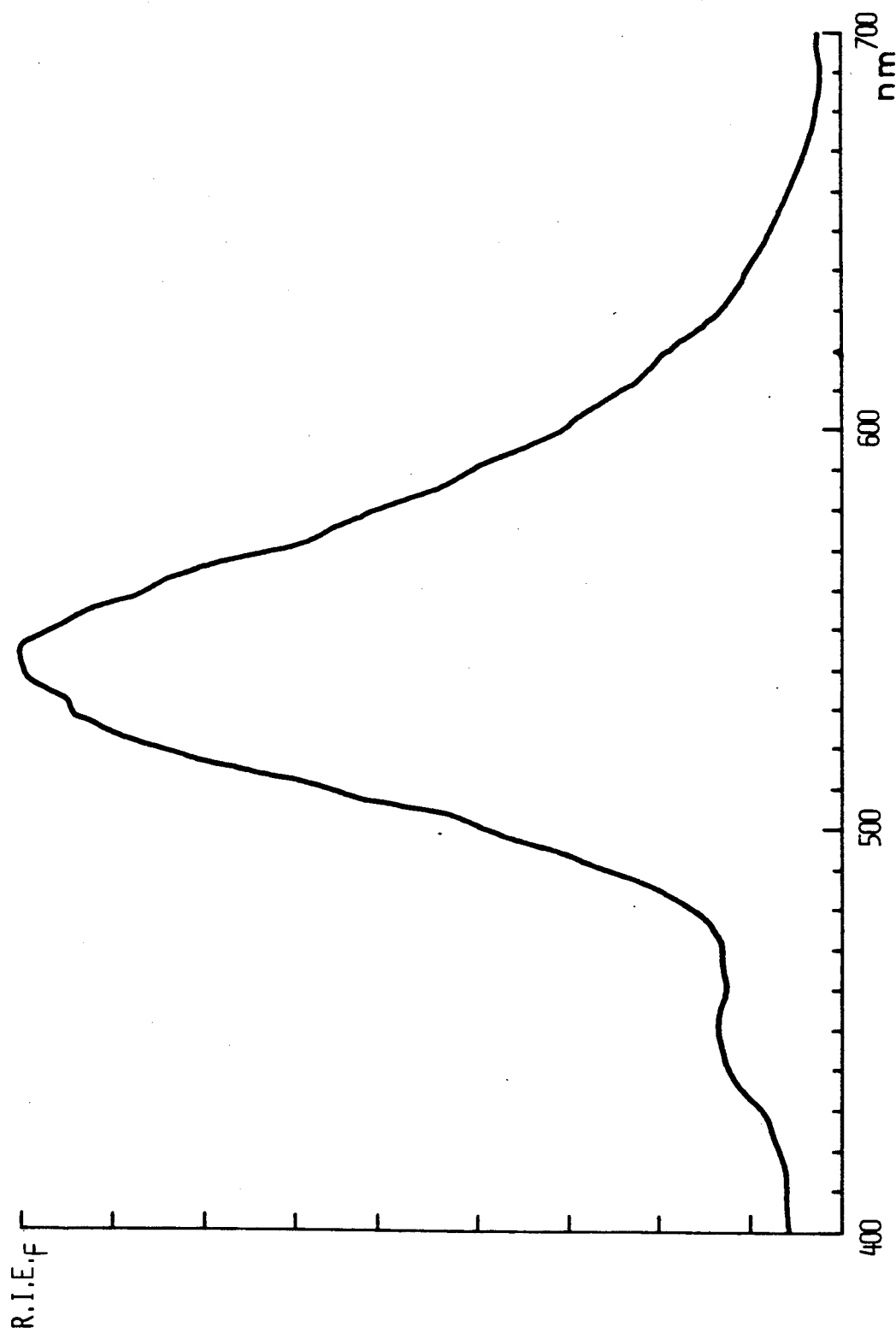

The prompt emission spectrum determined as described in example 1 is shown in FIG. 13. This is characterized by an emission peak at 544 nm with a half width of about 79 nm corresponding to $Sr_5Si_2O_7Cl_4:Eu^{2+}$ together with an impurity peak at about 450 nm corresponding to $Sr_5SiO_4Cl_6:Eu^{2+}$.

A screen was cast with this phosphor as described in example 1. The conversion efficiency and stimulation energy for 633 nm stimulation were determined as described in example 1 and were 0.21 pJ/mm2/mR and 270 μJ/mm2 respectively.

EXAMPLE 29

1.8470 g of coprecipitated $Sr_{0.998}Eu_{0.002}CO_3$, 3.3324 g of $SrCl_2$ hexahydrate, 1.2389 g of $SiO_2$ containing 9.08 wt % $H_2O$ and 3.2 ml of ethanol were mixed with agate balls in an agate grinding beaker in a planetary ball mill at maximum speed for 15 minutes. Once milled the resulting paste was dried for approximately 10 minutes in a drying oven at approximately 70° C. to evaporate the ethanol. The mixture was then placed in an alumina crucible and fired in a nitrogen atmosphere for 2 hours at 850° C. The mixture was heated up with the furnace at 600° C./hr and cooled with the furnace at 300° C./hr to 400° C. at which temperature the heating of the furnace was switched off and the contents allowed to cool naturally with the furnace. The product consisted of $Sr_4Si_3O_8Cl_4:Eu^{2+}$ as confirmed by XRD analysis.

Figure 14:
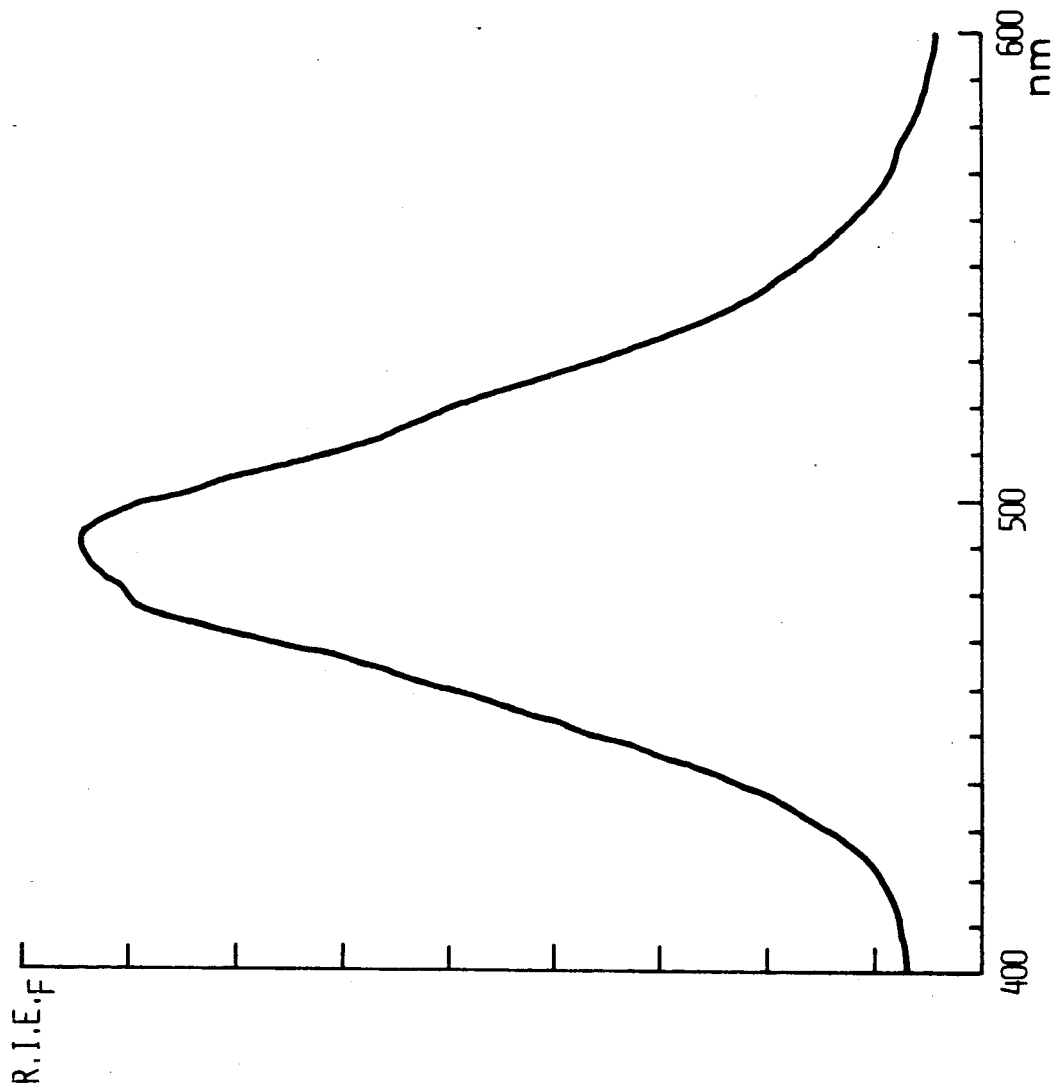

The prompt emission spectrum determined as described in example 1 is shown in FIG. 14. This is characterized by an emission peak at 491 nm with a half width of about 69 nm.

A screen was cast with this phosphor as described in example 1. The conversion efficiency and stimulation energy for 633 nm stimulation were determined as described in example 1 and were 0.055 pJ/mm2/mR and 88 μJ/mm2 respectively.

EXAMPLE 30

3.6942 g of coprecipitated $Sr_{0.998}Eu_{0.002}CO_3$, 0.9908 g of anhydrous $SrCl_2$, 0.8344 g of colloidal $SiO_2$ containing 9.08 wt % $H_2O$ and 2.8 ml of ethanol were mixed with agate balls in an agate grinding beaker in a planetary ball mill at maximum speed for 15 minutes. Once milled the resulting paste was dried for approximately 10 minutes in a drying oven at approximately 70° C. to evaporate the ethanol. The mixture was then placed in an alumina crucible and fixed in an atmosphere of 99.8% nitrogen and 0.2% hydrogen for 1 hour at 925° C. The mixture was heated up with the furnace at 600° C./hr and cooled with the furnace at 300° C./hr to 400° C. at which temperature the heating of the furnace was switched off and the contents allowed to cool naturally with the furnace. The product consisted of several phases: $Sr_5SiO_4Cl_6$: Eu and another phase or phases with strongest peaks obtained in XRD analysis at 3.006, 2.830 and 2.297 Å (angström=0.1 nm) as shown by analysis of the XRD spectrum whose main peaks with their relative intensities are tabulated in Table 4 below, wherein d represents the position of the diffraction peak in Å, and I stands for peak intensity.

TABLE 4

| d [Å] | (I/I₂.₈₃) × 100 | d [Å] | (I/I₂.₈₃) × 100 |
|---|---|---|---|
| 4.424 | 6* | | |
| 4.028 | 13 | 2.297 | 60 |
| 3.777 | 17* | 2.167 | 14 |
| 3.540 | 15* | 2.137 | 14 |
| 3.335 | 38* | 2.040 | 27 |
| 3.221 | 37 | 1.987 | 13 |
| 3.006 | 60 | 1.911 | 14 |
| 2.876 | 134* | 1.880 | 28 |
| 2.830 | 100 | 1.772 | 15 |
| 2.766 | 55 | 1.664 | 40 |
| 2.528 | 20 | 1.638 | 20 |
| 2.395 | 39 | 1.611 | 15 |
| — | — | 1.599 | 15 |
| — | — | 1.414 | 16 |

*minor contribution from $Sr_5SiO_4Cl_6$ peaks

Figure 15:
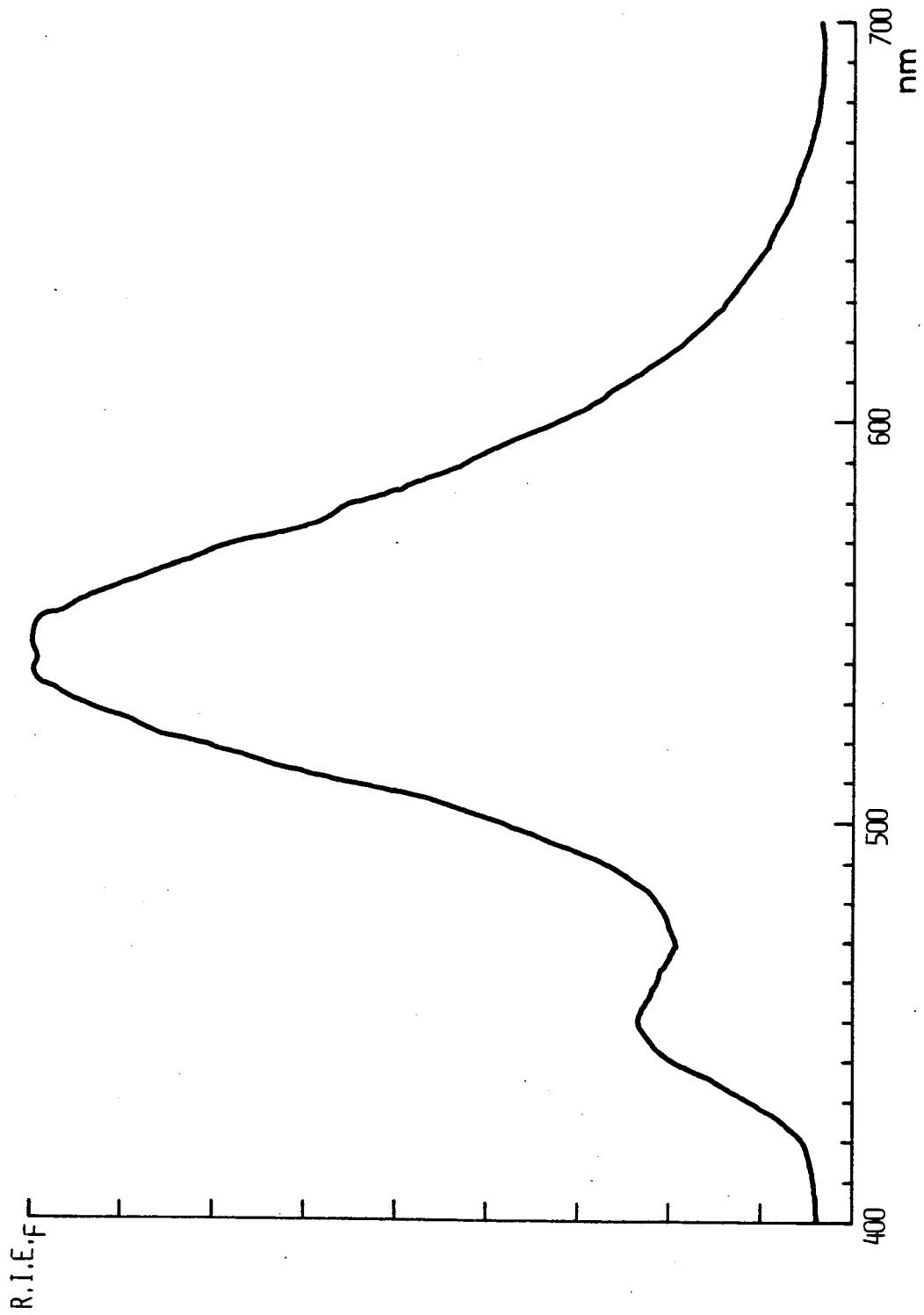

The prompt emission spectrum determined as described in example 1 is shown in FIG. 15. This is characterized by a minor emission peak at 450 nm corresponding to $Sr_5SiO_4Cl_6:Eu^{2+}$ emission and a major emission peak at 544 nm with a half width of about 83 nm corresponding to another phase or phases.

A screen was cast with this phosphor as described in example 1. The conversion efficiency and stimulation energy for 633 nm stimulation were determined as described in example 1 and were 1.60 pJ/mm2/mR and 150 uJ/mm2 respectively. The conversion efficiency and stimulation energy were also determined for 823 nm laser diode stimulation and found to be 0.17 pJ/mm2/mR and 315 μJ/mm2 respectively.

The response time of this phosphor screen was then determined by stimulating the irradiated screen with short diode laser light pulses at 823 nm in an analogous manner to that described in example 1. The response time being the time to reach half of the maximum energy of emitted light and designated t½ was 0.75 μs.

Figure 16:
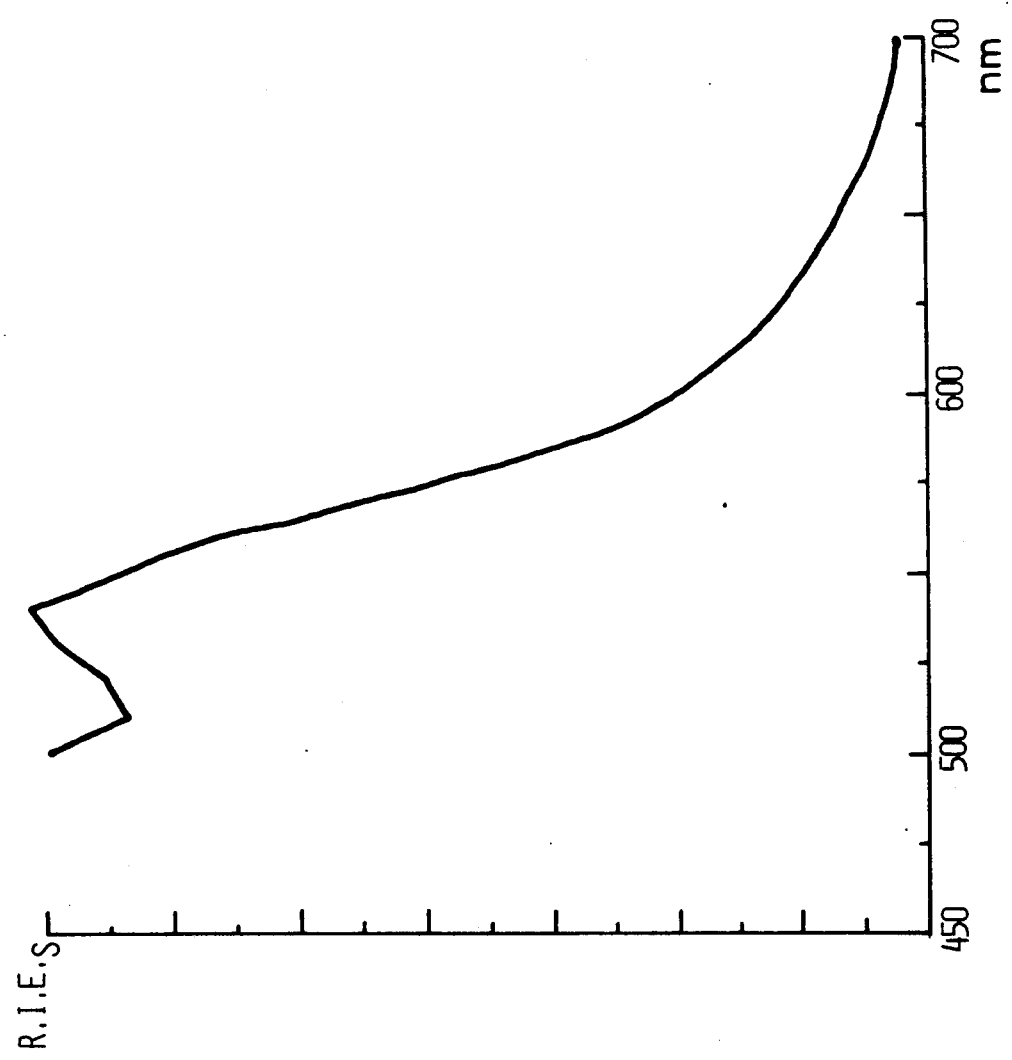
Figure 17:
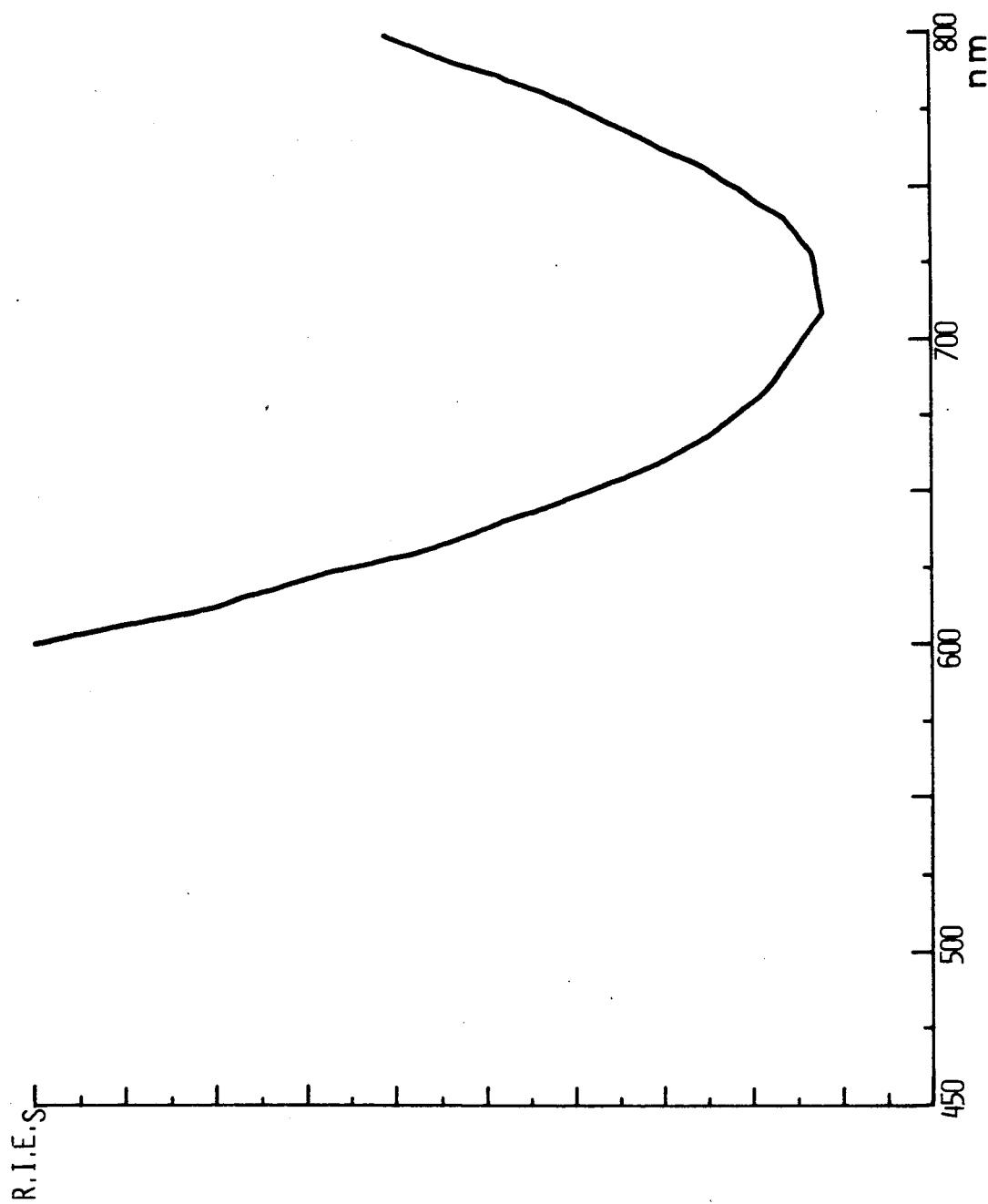

Finally the stimulation spectra of this phosphor were determined for both the 450 nm and 544 nm emissions and are shown in FIGS. 16 and 17 respectively.

The phase with the 544 nm emission is thought to have the empirical formula: $Sr_3Si_2O_{7-x/2}Cl_x$.

EXAMPLE 31

4.3433 g of $Ba_{0.995}Eu_{0.005}CO_3$ and 0.7209 g of $SiO_2$ were mixed with 8 ml of ethanol in a planetary ball mill for 15 minutes. 9.8192 g of anhydrous $BaBr_2$ were added after drying and dry-mixed in the planetary ball mill for 15 minutes.

The mixture was fired in an aluminum oxide crucible for a total of 3 h at 775° C. in an atmosphere of 5% by vol. of $H_2$ and 95% by vol. of $N_2$ yielding $Ba_5SiO_4Br_6:Eu^{2+}$ as confirmed by XRD analysis.

The conversion efficiency and stimulation energy for stimulation with He-Ne laser (633 nm) were determined and were 6.94 pJ/mm2/mR and 167 μJ/mm2 respectively.

The prompt emission is characterized by a single emission peak at 444 nm with a half width of about 29.5 nm.

COMPARATIVE EXAMPLE 1

1.8470 g of coprecipitated $Sr_{0.998}Eu_{0.002}CO_3$, 2.5762 g of anhydrous $SrCl_2$, 0.4297 g of $SiO_2$ containing 9.08 wt % $H_2O$ and 2.4 ml of ethanol were mixed with agate balls in an agate grinding beaker in a planetary ball mill at maximum speed for 15 minutes. Once milled the resulting paste was dried for approximately 10 minutes in a drying oven at approximately 70° C. to evaporate the ethanol. The mixture was then placed in an alumina crucible and fired in a nitrogen atmosphere for 1 hour at 800° C. The mixture was heated up with the furnace at 600° C./hr and cooled with the furnace at 300° C./hr at 400° C. after which the heating of the furnace was switched off and the mixture allowed to cool naturally with the furnace. The product consisted of a hitherto unknown strontium chlorosilicate with an XRD spectrum whose main peaks with their relative intensities are tabulated in Table 5 below, wherein d represents the position of the diffraction peak in Å and I stands for peak intensity.

TABLE 5

| d [Å] | (I/I₃.₀₁₁) × 100 | d [Å] | (I/I₃.₀₁₁) × 100 |
|---|---|---|---|
| 4.661 | 33 | 2.324 | 39 |
| 4.024 | 12 | 2.269 | 21 |
| 3.734 | 22 | 2.003 | 13 |
| 3.539 | 25 | 1.994 | 12 |
| 3.011 | 100 | 1.978 | 10 |
| 2.818 | 44 | 1.942 | 26 |
| 2.751 | 17 | 1.834 | 18 |
| 2.670 | 30 | 1.790 | 15 |
| 2.599 | 15 | 1.750 | 10 |
| 2.521 | 14 | 1.443 | 14 |
| 2.367 | 22 | — | — |

Figure 18:
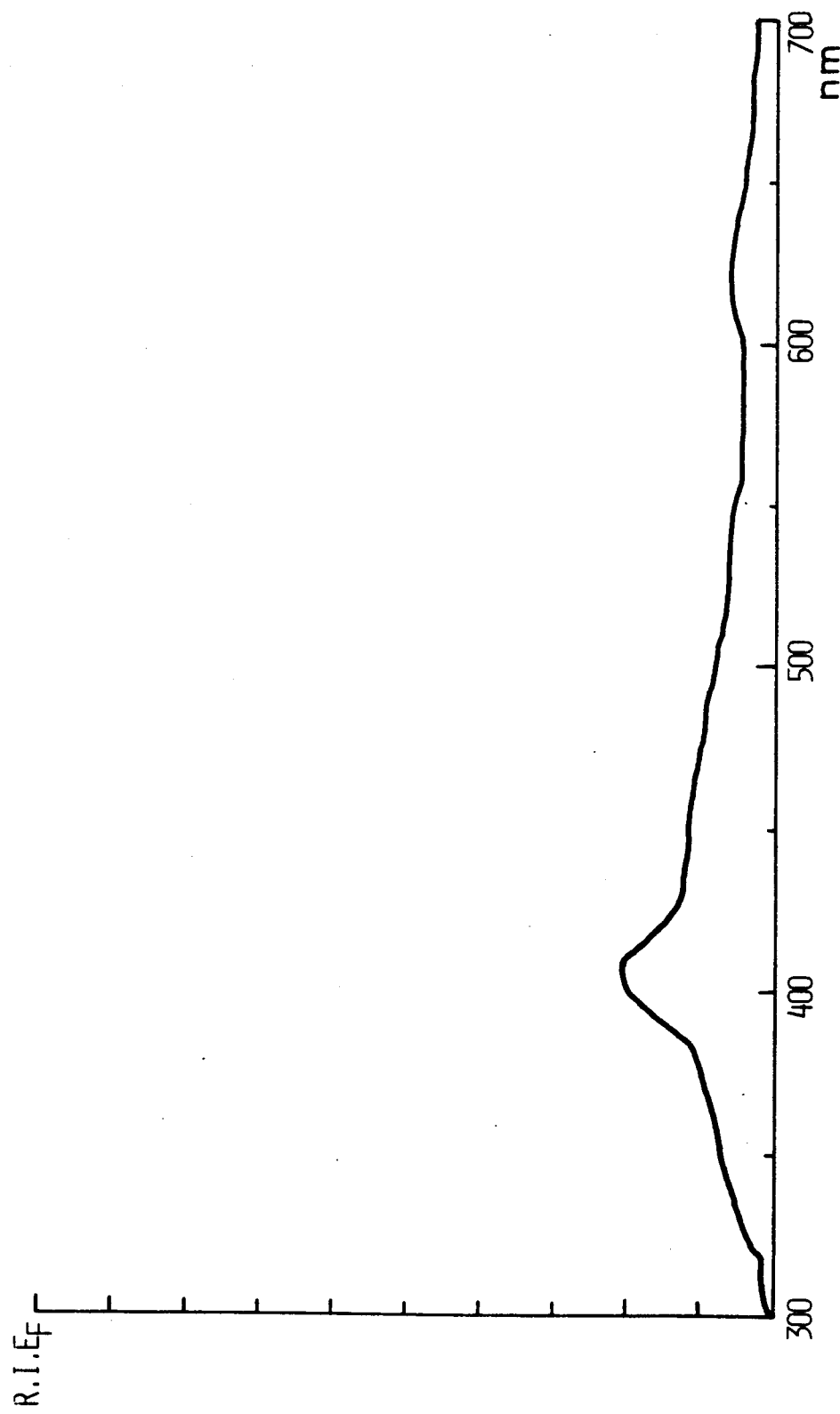

By analogy with the known XRD spectrum of $Ba_5Si_2O_6Cl_6$ and taking into account the ingredient ratios this hitherto unknown strontium chlorosilicate has been identified as: $Sr_5Si_2O_6Cl_6$. The deficiency in $SrCl_2$ over the ingredient ratio is explained by a small quantity of $SrCl_2$ in the phosphor as shown by the characteristic emission of $SrCl_2:Eu^{2+}$ (maximum emission at about 407 nm) in the prompt emission spectrum determined as described in example 1. The prompt emission spectrum is shown in FIG. 18. There appears to be no prompt emission from a "$Sr_5Si_2O_6Cl_6:Eu^{2+}$" phase although the emission spectrum was run at the highest sensitivity setting of the spectrofluorimeter.

We claim:

1. A method for recording and reproducing an X-ray image comprising the steps of:
   (1) causing a photostimulable phosphor in a binder layer to absorb image-wise or pattern-wise modulated X-rays,
   (2) photostimulating said phosphor with stimulating electromagnetic radiation selected from visible light and infrared light to release from the phosphor in accordance with the absorbed X-rays electromagnetic radiation different in wavelength characteristic from the radiation used in the photostimulation, and
   (3) detecting said light emitted by photostimulation, wherein said phosphor is a halosilicate containing as host metal at least one member selected from the group consisting of Ca, Sr, Ba, Mg, Cd, Zn and Pb, as halogen at least one member selected from the group consisting of Cl, Br and I, and comprising as dopant(s), also called activator(s), $Eu^{2+}$ and/or $Ce^{3+}$.

2. A method according to claim 1, wherein said dopant(s), $Eu^{2+}$ and/or $Ce^{3+}$ are present in said phosphor in combination with (a) co-dopant(s), the said co-dopant(s) being at least one member selected from the group consisting of La, Y, Sc and the lanthanide elements, or said co-dopant(s) being at least one of sodium and potassium.

3. A method according to claim 1, wherein the phosphor is within the scope of following empirical formula or a multiple thereof:

$$M_xM'_zSi_yO_{x+2y}X_{2z}: aA', bA''$$

wherein:
M and M' (same or different) are selected from the group consisting of Ca, Sr, Ba, Mg, Cd, Zn and Pb,
X is a member selected from the group consisting of Cl, Br and I or is a mixture of at least two of said elements,
A' represents a member selected from the group consisting of $Eu^{2+}$ and $Ce^{3+}$ or a mixture thereof,
A'' represents at least one member selected from the group consisting of La, Y, Sc and the lanthanide elements, or represents at least one of sodium and potassium,
x is in the range $3.5 > x > 0.5$,
y is in the range $3.5 > y > 0.5$,
z is in the range $4.5 > z > 0.1$,
a satisfies the following relation: $10^{-4} < a/(x+z+a+b) < 10^{-1}$, and
b satisfies the following relation: $0 \leq b/(x+z+a+b) < 5 \times 10^{-2}$.

4. A method according to claim 3, wherein A' and A'' are different elements and/or have different chemical valency states.

5. A method according to claim 3, wherein the phosphor corresponds to one of the following empirical formulae:

$(Sr,Ba)_5SiO_4Cl_6:aA',bA''; (Sr,Ba)_5Si_2O_6Cl_6:aA',bA'';$ $(Sr,Ba)_5SiO_4Br_6:aA',bA''; (Sr,Ba)_5Si_2O_7Cl_4:aA',bA'';$ $(Sr,Ba)_4Si_3O_8Cl_4:aA',bA''$, and $(Sr,Ba)_3Si_2O_{7-x/2}Cl_x:aA',bA''.$ wherein
A' respresents a member selected from the group consisting of $Eu^{2+}$ and $Ce^{3+}$ or a mixture thereof,
A'' represents at least one member selected from the group consisting of La, Y, Sc and the lanthanide elements,
a is the atomic fraction of A' and is in the range $10^{-4}$ to $10^{-1}$, and
b is the atomic fraction of A'' and is in the range 0 to $5 \times 10^{-2}$.

6. A method according to claim 3, wherein the phosphor is a halo-orthosilicate wherein M and M' correspond to Sr and/or Ba, $x=2$, $y=1$ and $z=3$.

7. A method according to claim 3, wherein A'' is one or more of gadolinium, yttrium, lanthanum, samarium and lutetium.

8. A method according to claim 1, wherein the photostimulation proceeds with visible light in the wavelength range of 480-560 nm.

9. A method according to claim 8, wherein the photostimulation proceeds with a laser beam.

10. A method according to claim 9, wherein the photostimulation proceeds with an argon ion laser emitting at 514 nm.

11. A method according to claim 1, wherein before detecting said light emitted by photostimulation the stimulating electromagnetic radiation is filtered out by one or more optical filters having a high transmission for the light emitted on photostimulation.

12. A method according to claim 1, wherein the detection of the light emitted by photostimulation proceeds with a phototube providing electrical signals that can be digitized and stored.

13. A method according to claim 12, wherein after storage said signals are subjected to digital processing.

14. A method according to claim 12, wherein digital signals obtained from analog-digital conversion of the electrical signals corresponding with the light obtained through photostimulation are displayed on a cathode-ray tube.

15. A method according to claim 12, wherein the digital signals are transformed into analog signals that are used to modulate a writing laser beam for scanning a photographic material.

16. A photostimulable phosphor which is a halosilicate containing as host metal at least one member selected from the group consisting of Ca, Sr, Ba, Mg, Cd, Zn and Pb, as halogen at least one member selected from the group consisting of Cl, Br and I, and as activator (dopant) $Eu^{2+}$ in combination with (a) co-dopant(s) being at least one member selected from the group consisting of La, Y, Sc and the lanthanide elements excluding $Eu^{2+}$ or being at least one of sodium and potassium.

17. A photostimulable phosphor which is a halosilicate containing as host metal at least one member selected from the group consisting of Ca, Sr, Ba, Mg, Cd, Zn and Pb, as halogen at least one member selected from the group consisting of Cl, Br and I, and as activator (dopant) $Ce^{3+}$ in combination with (a) co-dopant(s) being at least one member selected from the group consisting of La, Y, Sc and the lanthanide elements excluding $Ce^{3+}$ and terbium or being at least one of sodium and potassium.

18. A photostimulable phosphor according to claim 16, wherein said phosphor is within the scope of following empirical formula or a multiple thereof:

$$M_xM'_zSi_yO_{x+2y}X_{2z}:aA',bA''$$

wherein:
M and M' (same or different) are selected from the group consisting of Ca, Sr, Ba, Mg, Cd, Zn and Pb,
X is a member selected from the group consisting of Cl, Br and I or is a mixture of at least two of said elements,
A' represents $Eu^{2+}$,
A'' represents at least one member selected from the group consisting of La, Y, Sc and the lanthanide elements excluding $Eu^{2+}$ or represents at least one of sodium and potassium,
x is in the range $3.5 > x > 0.5$,
y is in the range $3.5 > y > 0.5$,
z is in the range $4.5 > z > 0.1$,
a satisfies the following relation: $10^{-4} < a/(x+z+a+b) < 10^{-1}$, and
b satisfies the following relation: $0 \leq b/(x+z+a+b) < 5 \times 10^{-2}$.

19. A photostimulable phosphor according to claim 16, wherein said phosphor is within the scope of following empirical formula or a multiple thereof:

$$M_xM'_zSi_yO_{x+2y}X_{2z}:aA',bA''$$

wherein:

M and M' (same or different) are selected from the group consisting of Ca, Sr, Ba, Mg, Cd, Zn and Pb, X is a member selected from the group consisting of Cl, Br and I or is a mixture of at least two of said elements, A' represents $Ce^{3+}$, A" represents at least one member selected from the group consisting of La, Y, Sc and the lanthanide elements excluding $Ce^{3+}$ and terbium or represents at least one of sodium and potassium, x is in the range $3.5 > x > 0.5$, y is in the range $3.5 > y > 0.5$, z is in the range $4.5 > z > 0.1$, a satisfies the following relation: $10^{-4} < a/(x+z+a+b) < 10^{-1}$, and b satisfies the following relation: $0 \leq b/(x+z+a+b) < 5 \times 10^{-2}$.

20. A photostimulable phosphor according to claim 18, wherein A' and A" are different elements and/or have different chemical valency states.

21. A photostumulable phosphor according to claim 19, wherein A' and A" are different elements and/or have different chemical valency states.

22. A photostimulable phosphor according to claim 18, wherein M and M' correspond to Sr and/or Ba, $x=2, y=1, z=3$, and A" represents at least one member selected from the group consisting of gadolinium, yttrium, lanthanum, samarium and lutetium.

23. A photostimulable phosphor according to claim 19, wherein M and M' correspond to Sr and/or Ba, $x=2, y=1, z=3$, and A" represents at least one member selected from the group consisting of gadolinium, yttrium, lanthanum, samarium and lutetium.

24. A radiation image storage panel comprising in an organic film polymer binder layer a photostimulable phosphor, wherein said phosphor is a halosilicate containing as host metal at least one member selected from the group consisting of Ca, Sr, Ba, Mg, Cd, Zn and Pb, as halogen at least one member selected from the group consisting of Cl, Br and I, and comprising as dopant(s), also called activator(s), $Eu^{2+}$ and/or $Ce^{3+}$.

25. A radiation image storage panel according to claim 24, wherein said dopant(s), $Eu^{2+}$ and/or $Ce^{3+}$ are present in said phosphor in combination with (a) co-dopant(s), said co-dopant(s) being at least one member selected from the group consisting of La, Y, Sc and the lanthanide elements or said co-dopant(s) being at least one of sodium and potassium.

26. A radiation image storage panel according to claim 24, wherein the phosphor is within the scope of following empirical formula or a multiple thereof:

$$M_xM'_zSi_yO_{x+2y}X_{2z}:aA', bA''$$

wherein:

M and M' (same or different) are selected from the group consisting of Ca, Sr, Ba, Mg, Cd, Zn and Pb, X is a member selected from the group consisting of Cl, Br and I or is a mixture of at least two of said elements, A' represents a member selected from the group consisting of $Eu^{2+}$ and $Ce^{3+}$ or a mixture thereof, A" represents at least one member selected from the group consisting of La, Y, Sc and the lanthanide elements or represents at least one of sodium and potassium, x is in the range $3.5 > x > 0.5$, y is in the range $3.5 > y > 0.5$, z is in the range $4.5 > z > 0.1$, a satisfies the following relation: $10^{-4} < a/(x+z+a+b) < 10^{-1}$, and b satisfies the following relation: $0 \leq b/(x+z+a+b) < 5 \times 10^{-2}$.

27. A radiation image storage panel according to claim 26, wherein A' and A" are different elements and/or have different chemical valency states.

28. A radiation image storage panel according to claim 24, wherein the phosphor corresponds to one of the following empirical formulae:

$$(Sr,Ba)_5SiO_4Cl_6:aA',bA''; (Sr,Ba)_5Si_2O_6Cl_6:aA',bA'';$$

$$(Sr,Ba)_5SiO_4Br_6:aA',bA''; (Sr,Ba)_5Si_2O_7Cl_4:aA',bA'';$$

$$(Sr,Ba)_4Si_3O_8Cl_4:aA',bA'', \text{ and}$$

$$(Sr,Ba)_3Si_2O_{7-x/2}Cl_x:aA',bA''.$$

wherein

A' respresents a member selected from the group consisting of $Eu^{2+}$ and $Ce^{3+}$ or a mixture thereof, A" represents at least one member selected from the group consisting of La, Y, Sc and the lanthanide elements, a is the atomic fraction of A' and is in the range $10^{-4}$ to $10^{-1}$, and b is the atomic fraction of A" and is in the range 0 to $5 \times 10^{-2}$.

29. A radiation image storage panel according to claim 26, wherein the phosphor is a halo-orthosilicate wherein M and M' correspond to Sr and/or Ba, $x=2$, $y=1$ and $z=3$.

30. A radiation image storage panel according to claim 26, wherein A" is one or more of gadolinium, yttrium, lanthanum, samarium and lutetium.

31. A radiation image storage panel according claim 24, wherein the phosphor is applied at a coverage in the range from 300 to 1500 g/m2.

32. A radiation image storage panel according to claim 31, wherein the phosphor layer is used as a supported layer on a support sheet.

33. A method for recording and reproducing a radiation image comprising the steps of (i) causing a visible radiation stimulable phosphor to absorb an x-ray radiation passing through an object, (ii) stimulating said phosphor with visible radiation to release the stored energy as fluorescent light and (iii) detecting said fluorescent light with light detecting means, characterized by the fact that said phosphor is selected within the group of divalent europium activated alkali earth metal halosilicates.

* * * * *